US010373238B2

(12) United States Patent
Hill

(10) Patent No.: US 10,373,238 B2
(45) Date of Patent: Aug. 6, 2019

(54) SYSTEMS AND METHODS FOR VEHICLE REFUELING

(71) Applicant: Powerbanq, LLC, Minneapolis, MN (US)

(72) Inventor: Newell H. Hill, Belle Plaine, MN (US)

(73) Assignee: POWERBANQ, LLC, Minneapolis, MN (US)

( * ) Notice: Subject to any disclaimer, the term of this patent is extended or adjusted under 35 U.S.C. 154(b) by 0 days.

(21) Appl. No.: 15/209,934

(22) Filed: Jul. 14, 2016

(65) Prior Publication Data

US 2016/0321740 A1 Nov. 3, 2016

Related U.S. Application Data

(63) Continuation-in-part of application No. 15/014,836, filed on Feb. 3, 2016.

(60) Provisional application No. 62/111,782, filed on Feb. 4, 2015.

(51) Int. Cl.
| | |
|---|---|
| *G06Q 30/00* | (2012.01) |
| *G06Q 30/06* | (2012.01) |
| *G01C 21/34* | (2006.01) |
| *B67D 7/04* | (2010.01) |
| *G06Q 50/06* | (2012.01) |
| *G06Q 10/06* | (2012.01) |
| *B60L 53/80* | (2019.01) |
| *B60L 53/35* | (2019.01) |

(52) U.S. Cl.
CPC .......... *G06Q 30/0635* (2013.01); *B60L 53/35* (2019.02); *B60L 53/80* (2019.02); *B67D 7/04* (2013.01); *B67D 7/0498* (2013.01); *G01C 21/3407* (2013.01); *G06Q 10/0631* (2013.01); *G06Q 50/06* (2013.01)

(58) Field of Classification Search
CPC ................................. G06Q 30/06–08
USPC .............................. 705/26.1–27.2
See application file for complete search history.

(56) References Cited

U.S. PATENT DOCUMENTS

| | | | | |
|---|---|---|---|---|
| 3,822,504 A | * | 7/1974 | Kuehn | A01G 31/00 47/62 R |
| 4,704,062 A | * | 11/1987 | Hale | B62D 53/062 280/441.2 |
| 6,374,870 B1 | | 4/2002 | Müller | |
| 2002/0073012 A1 | | 6/2002 | Lowell et al. | |
| 2006/0058955 A1 | * | 3/2006 | Mehren | G01C 21/3469 701/533 |
| 2010/0082246 A1 | * | 4/2010 | Crane | G01C 21/3476 701/533 |

(Continued)

*Primary Examiner* — Ethan D Civan

(74) *Attorney, Agent, or Firm* — Nadeem W. Schwen; Winthrop & Weinstine, P.A.

(57) ABSTRACT

The present disclosure relates to systems and methods for replenishing the power source of a user vehicle. The system may comprise at least one power source transport vehicle, the power source transport vehicle having at least one power source container; a vendor device; and a platform having at least a vendor interface for display on the vendor device and a user interface for display on a user device. The platform receives a user request through the user interface regarding the user vehicle. The power source transport vehicle is then deployed to the location of the vehicle based on the user request and replenishes the power source of the user vehicle based on the user request.

20 Claims, 39 Drawing Sheets

(56) References Cited

U.S. PATENT DOCUMENTS

2010/0185357 A1* 7/2010 Mizumachi ......... B60L 11/1816
                                                        701/31.4
2012/0303397 A1* 11/2012 Prosser ................ H02J 7/0054
                                                        705/7.12
2017/0140455 A1* 5/2017 Tryba ................. G06Q 30/0633
2017/0332344 A1* 11/2017 Rao ........................ G01C 21/32

* cited by examiner

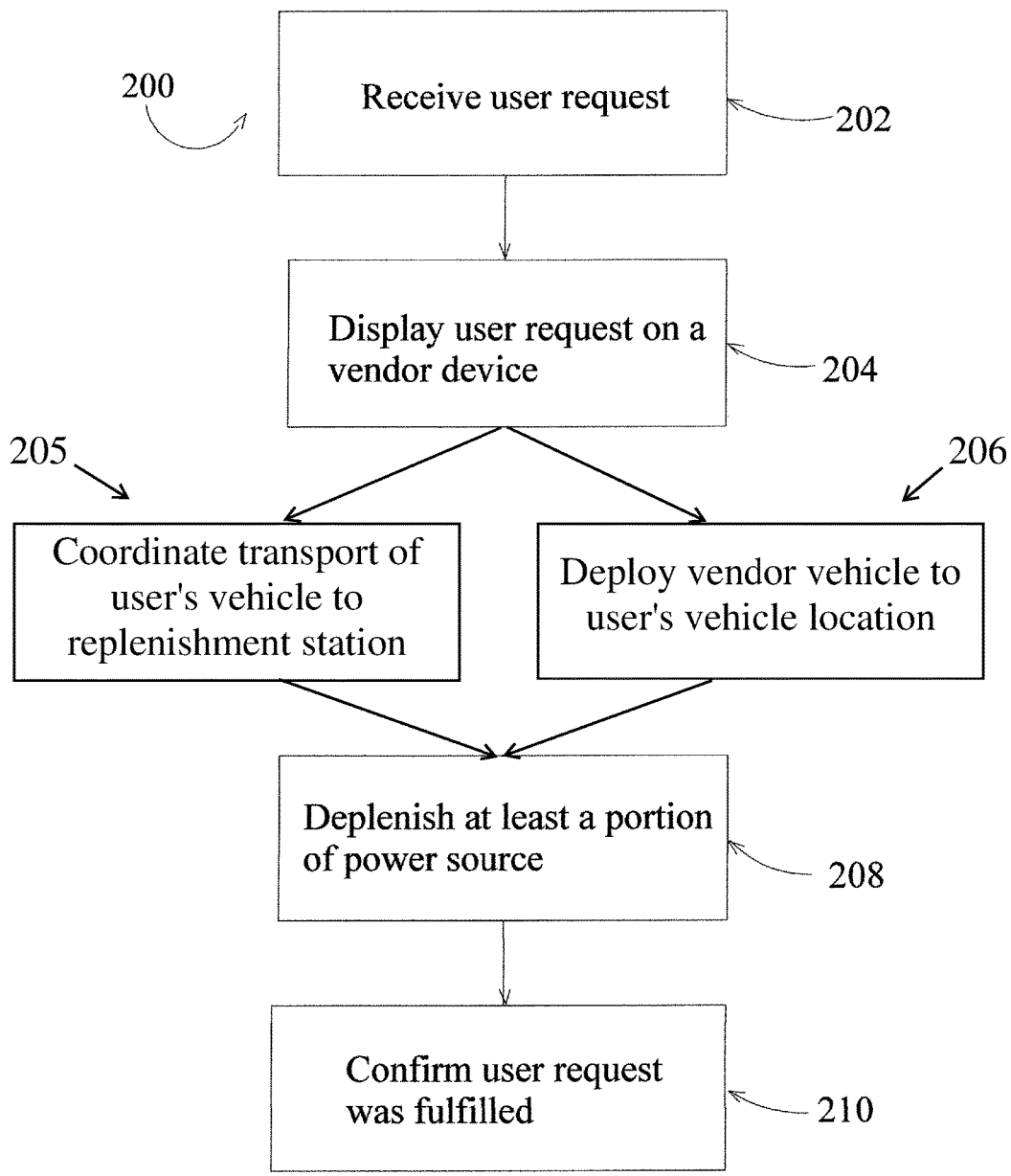

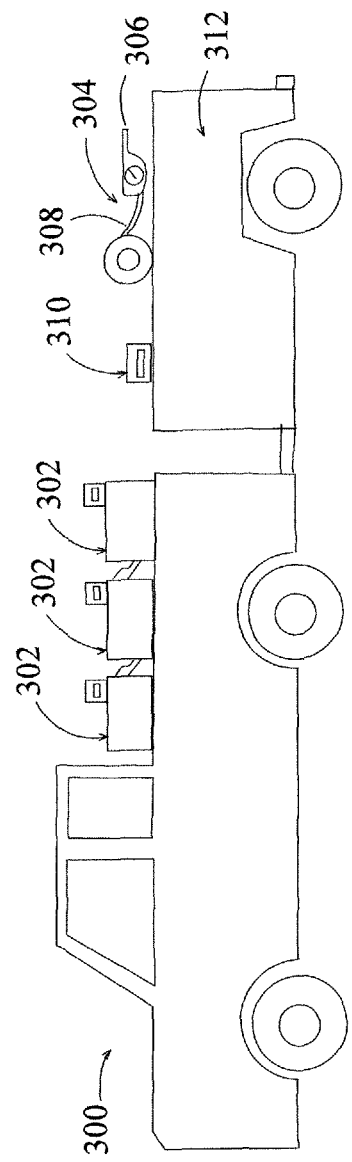

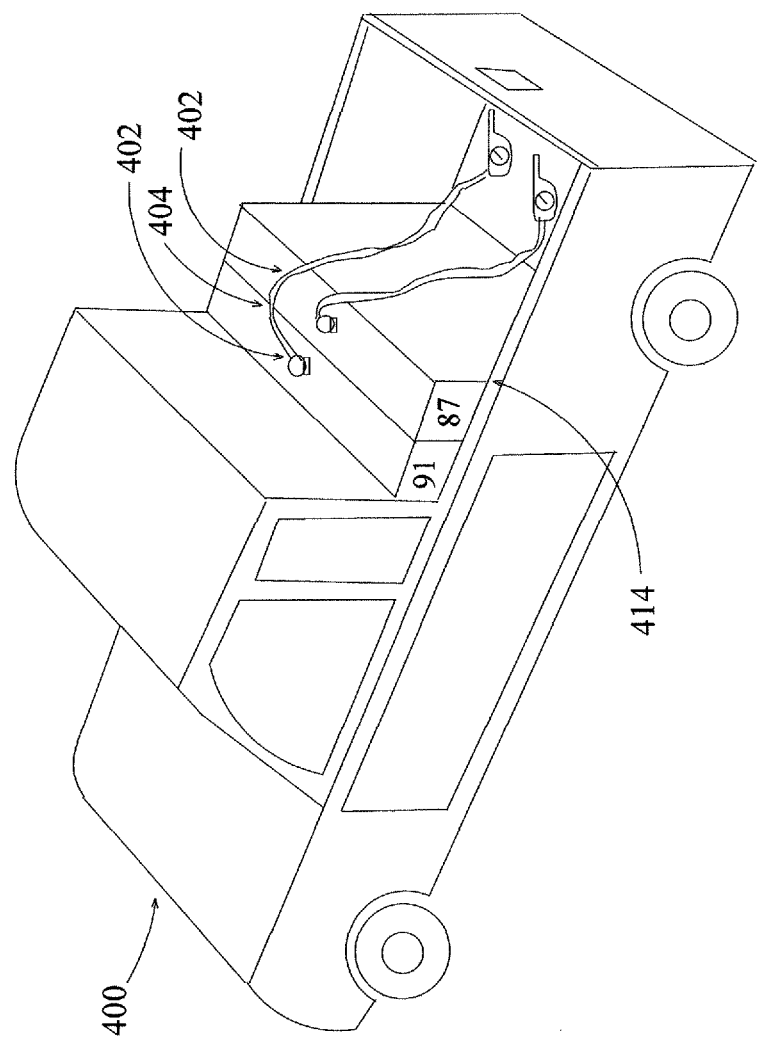

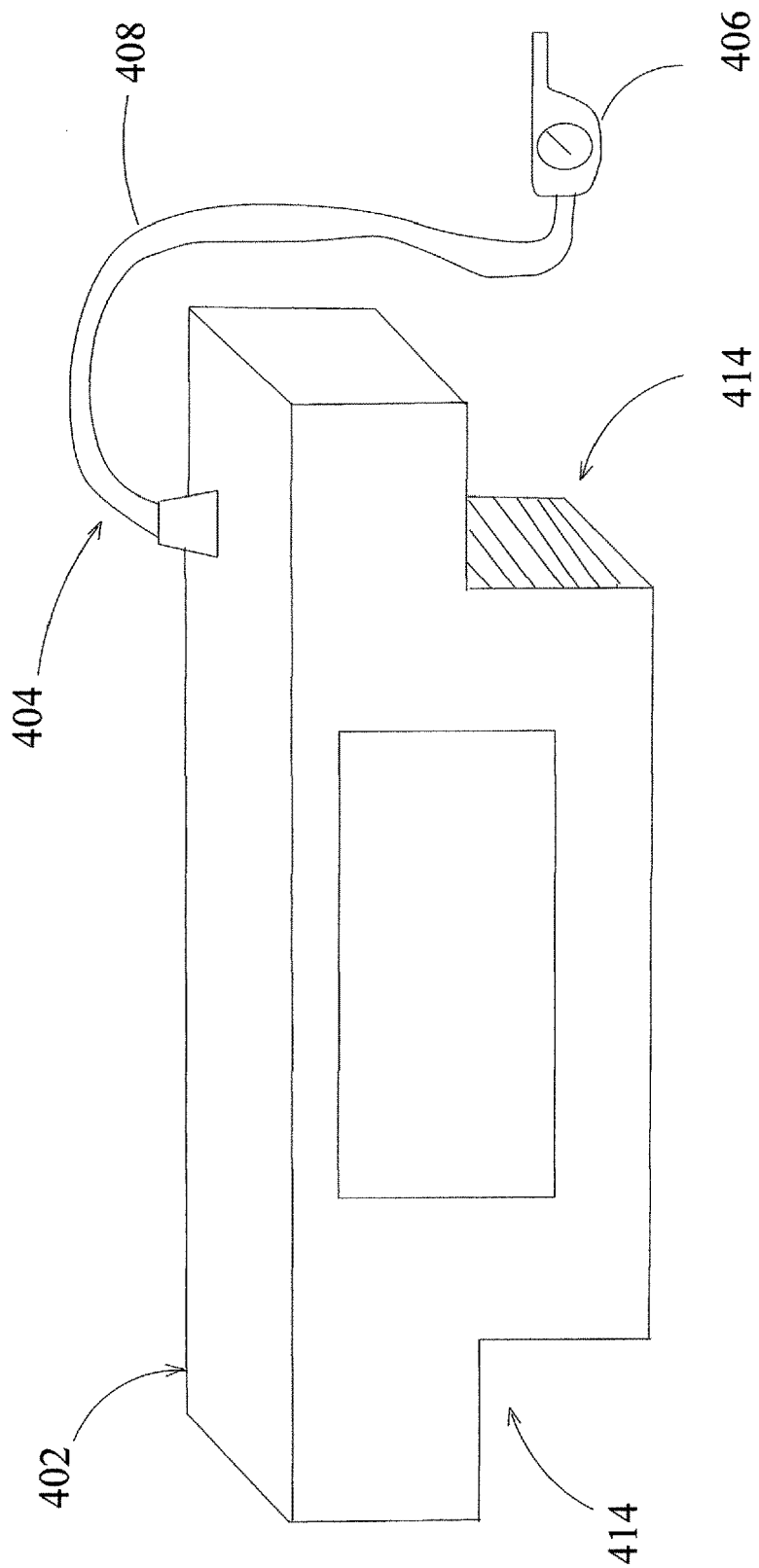

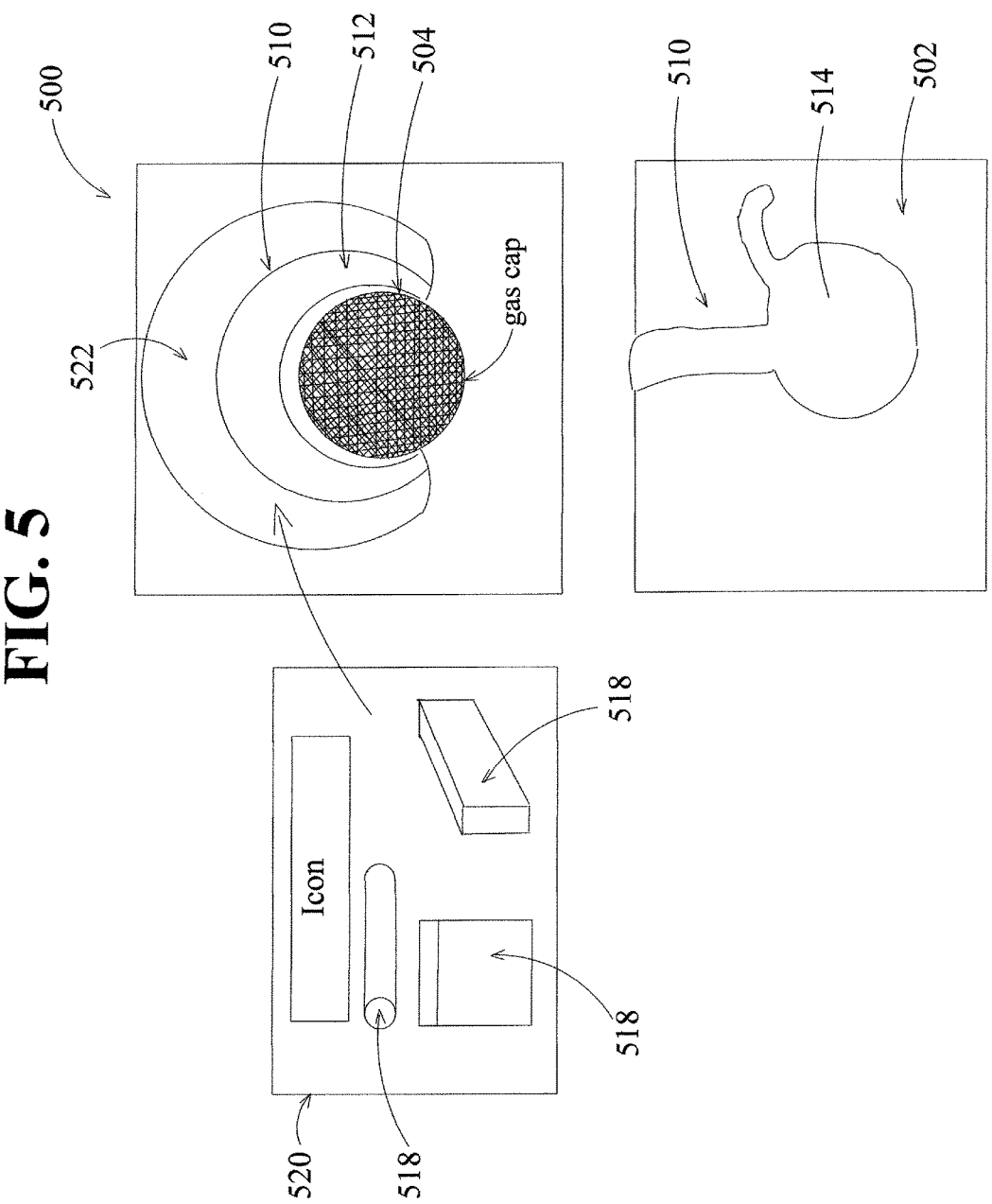

SYSTEMS AND METHODS FOR VEHICLE REFUELING

CROSS-REFERENCE TO RELATED APPLICATIONS

This application is a continuation-in-part of U.S. patent application Ser. No. 15/014,836, filed on Feb. 3, 2016, entitled "System and Method for Vehicle Refueling," which claims the benefit of U.S. provisional patent application Ser. No. 62/111,782, filed on Feb. 4, 2015, entitled "System and Method for Vehicle Refueling," the disclosures of which are hereby incorporated by reference herein in their entirety.

FIELD OF THE INVENTION

The present application generally relates to fuel or power sources of a vehicle. More particularly, the present application is generally directed to systems and methods for managing and replenishing fuel or power sources of a vehicle.

BACKGROUND OF THE INVENTION

Vehicles utilize various types of power sources to create motion in order to transport passengers and/or cargo and/or perform various types of services. Currently, most vehicles use a carbon based fuel source to power an internal combustion engine. There is an increasing percentage of vehicles that use an electric or other non-carbon based power source. For all energy power sources, the vehicle's power source will typically need to be replenished, creating a potential inconvenience for the vehicle's user.

Carbon based fuels, such as gasoline, diesel, or ethanol, are generally transported in at least one tank located within a vehicle. The fuel in such a tank eventually needs to be replenished periodically, usually within a 200-300 mile range. The common way to replenish a tank has traditionally included stopping at a gas station, parking by a pump station, removing the cap for the tank, inserting a nozzle into the pipe for the tank, filling the tank, placing the cap on the tank, and paying for the fuel. For safety concerns, the driver of the vehicle is usually required to remain by the vehicle for the duration of time needed to fill the tank. Although most gas stations provide some type of roof that covers the fuel pumps, a person who uses the pump may be exposed to various weather elements, including extreme hot or cold temperature, wind gusts, and other severe weather. Additionally, during the filling process, fuel can be spilled and/or evaporated into the air, subjecting a person to harmful chemical vapors. One of these vapors is benzene, a known carcinogen. The present disclosure helps a vehicle's user avoid such exposure to weather conditions and/or harmful chemical vapors during a vehicle's power source replenishment process.

Additionally, time is an increasingly valuable resource, and services that help a person to be more efficient with his or her time will reduce costs. Today, it is common for a vehicle user to take time out of his or her day to replenish a vehicle's power source. Often, there is more than one person that is present in the vehicle when replenishing the fuel source, and, thus, this takes the time of more than one person. For example, there may be a working crew in the vehicle. In addition to the time expended, there is depletion of the power source driving to the destination to replenish the power source. The various embodiments of the present disclosure reduce or eliminate the amount of user's time and the consumption of power source required when there is a need to replenish the power source. Further yet, with advancement in autonomous driving and vehicle navigation systems, various embodiments of the present disclosure describe a process and system for the user vehicle to communicate and coordinate with a power source replenishment source to replace, refill, or otherwise replenish the vehicle power source supply.

BRIEF SUMMARY OF THE INVENTION

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

The various embodiments of the present disclosure permit vehicle users to use a phone, tablet, computer, vehicle console modules, or other electronic device(s) to order or request a vendor to come to the location of the user's vehicle and replenish the power source for their vehicle. In many embodiments, the user does not need to be in physical proximity to their vehicle. A vendor can also perforin basic repairs, maintenance and inspections on and for the vehicle, deliver items purchased by the user, and perform additional vehicle services.

In at least one embodiment, a system for replenishing a power source of a user vehicle comprises at least one power source transport vehicle, the power source transport vehicle having at least one power source container; a vendor device; and a platform having at least a vendor interface for display on the vendor device and a user interface for display on a user device, wherein the platform receives a user request through the user interface regarding the user vehicle and displays information regarding the user request through the vendor interface. A power source transport vehicle is deployed to the location of the user vehicle and replenishes the power source of the user vehicle based on the user request. The power source may comprise at least one of gasoline, diesel, biodiesel, ethanol, isobutanol, methanol, butane, kerosene, propane, natural gas, synthetic fuels, complex hydrides, hydrogen, hydrogen peroxide, and oxygen. The power source may be at least one fuel cell. The power source may be at least one battery. The power source transport vehicle may have removable power source containers. The power source transport vehicle may have a first removable power source container having a first power source and the second removable power source container having a second power source, wherein the second power source may be different than the first. In at least one embodiment, the user request comprises power source replenishment information and at least one maintenance service. In at least one embodiment, the user request comprises at least vehicle information, the location of the vehicle, and a power source selection. The user request may be setup as a recurring, or automatic, request. The user vehicle may have a power source replenishment access point, and the power source transport vehicle replenishes the power source at the power source access point. In one embodiment, the power source replenishment access point comprises at least one of a cap, cover, and protective panel. In some embodiments, the power source replenishment access point has a locking mechanism.

A method for replenishing a power source of a user vehicle may, in some embodiments, comprise receiving a user request for power source replenishment services for a user vehicle at a location; displaying the user request on a vendor device associated with a vendor vehicle; deploying the vendor vehicle to the location; and replenishing an amount of power source on the user vehicle from an amount of power source stored on the vendor vehicle. In some embodiments, the method further comprises displaying a confirmation that the user request has been fulfilled. In some embodiments, the method comprises unlocking a locking mechanism of a power source replenishment access point of the user vehicle. In some embodiments, the user vehicle may use an onboard computer to communicate with a power source replenishment station in order to coordinate the replenishment of the vehicle power source. In some embodiments, the user vehicle onboard navigation system can assist the user and/or autonomously navigate the user's vehicle to a replenishment station without direct input from the user. In some embodiments, the user performs the power source replenishment process. In some embodiments, the power source replenishment process is performed by a person and/or mechanism(s) located at the power source replenishment station.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

FIG. 2 is a flowchart of one embodiment of a method for replenishing a power source for a user vehicle according to one or more embodiments.

FIGS. 3A-3C are schematic diagrams of embodiments of power source transport vehicles.

FIG. 4A is a plan view of one embodiment power source transport vehicle.

FIG. 4B is a plan view of one embodiment power source container for the power source transport vehicle of FIG. 4A.

FIG. 5 is a schematic diagram of one embodiment of a power source replenishment access point of a user vehicle.

DETAILED DESCRIPTION

Figure 1:
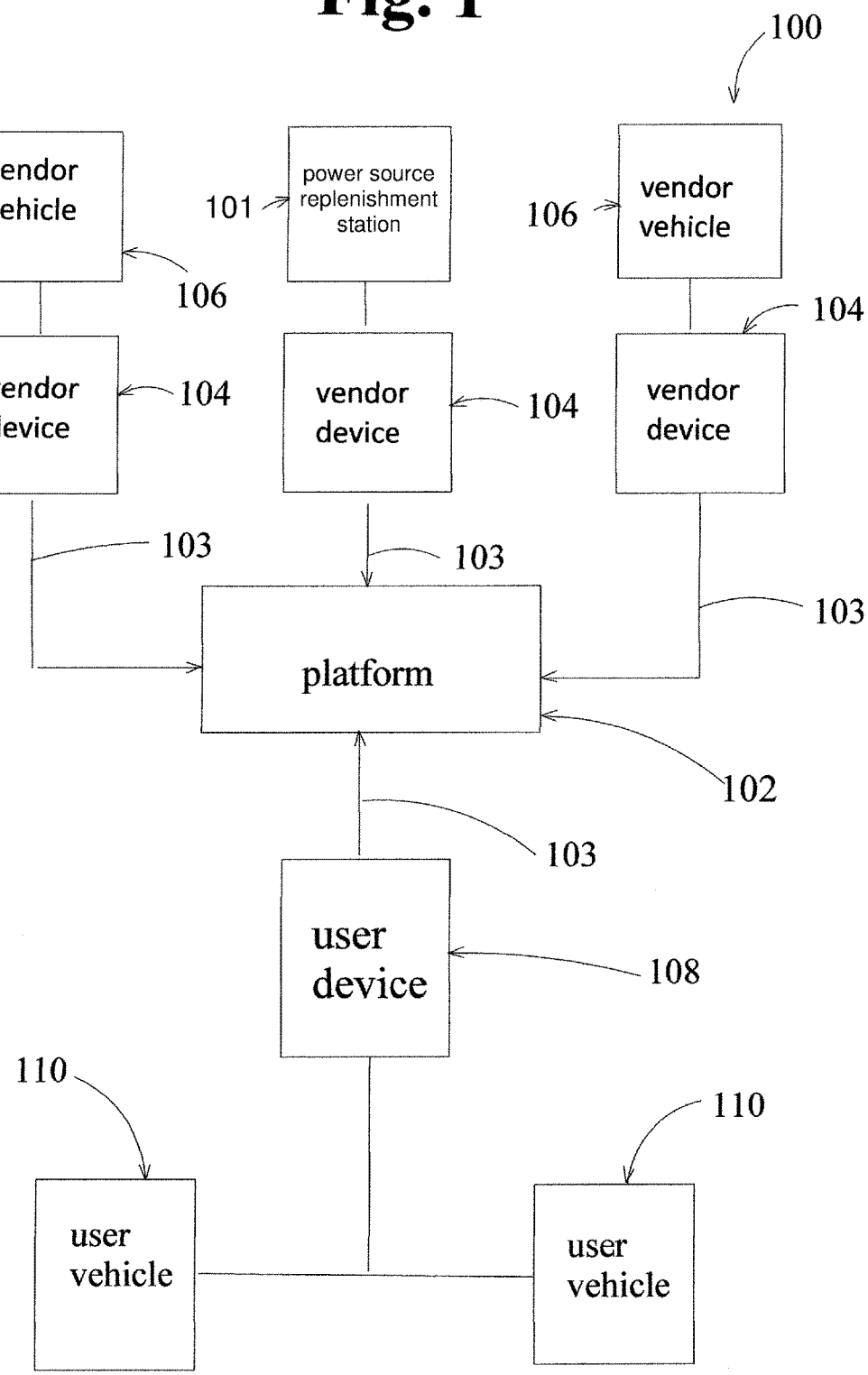
FIG. 1 is a schematic diagram of one embodiment of a system for replenishing a power source for a user vehicle.

The present disclosure relates to novel and advantageous systems and methods for replenishing a power source for a vehicle. Particularly, the present disclosure relates to novel and advantageous systems for replenishing the power source in a user's vehicle wherein the user uses an electronic device to request power source replenishment with a vendor who uses a power source transport vehicle to go to the location of the user's vehicle and replenish the power source. The user requests the vendor to travel to the location of the user's vehicle and replenish the power source. The present disclosure also relates to systems for replenishing the power source in a user's vehicle in which a vehicle coordinates with an app and navigates via an on-board navigation system to a power replenishment station, where it receives power source replenishment. These novel systems reduce or eliminate the time that the user would spend replenishing the power supply. Because a vendor delivers the power source replenishment to the user's vehicle and/or the vendor facilitates the navigation and transportation of the user's vehicle to the power source replenishment station, such systems have the potential to eliminate the need for the user and/or the vehicle to travel or otherwise have physical involvement with the power source replenishment process.

Among standard dictionary definitions and uses of the team, a "vehicle" may include a machine that is powered by a motor, jet engine, or rocket propulsion and is used to carry at least one person and/or goods from one place to another. Among standard dictionary definitions and uses of the term, "vehicle" may also include a machine that uses a motor, jet engine, or rocket propulsion to transport itself, and while in transport, carry people and/or goods from one place to another, and/or perform a service. A power source may be used to run the motor, jet engine, or rocket propulsion that in turn moves the vehicle on land, on water, or in the air. Types of user vehicles include but are not limited to: cars, trucks, SUVs, motorcycles, ATVs, snowmobiles, other wheeled vehicles, boats, other water vessels, or aircraft, including but not limited to fixed wing, rotor wing, and lighter-than-air aircraft. In some embodiments, a user vehicle may further include small engine devices, farm equipment, or other motorized devices needing power source replenishment.

Among standard dictionary definitions and uses of the term, a "power source" may include a product that fuels the motor, jet, or rocket propulsion that moves the vehicle. For liquid power sources, these are commonly different grades of gasoline, diesel, biodiesel, and ethanol. Liquid power sources also include other carbon based power sources such as isobutanol, methanol, butane, kerosene, natural gas, and propane and other non-carbon based fuels such as synthetic fuels, complex hydrides, hydrogen, hydrogen peroxide, and oxygen. Battery power sources can have one or more batteries that power the motor which moves the vehicle. Some embodiments may use electrical power as the power source. Other liquid, gas, or solid power source options may similarly be used in a variety of vehicle designs, and are within the scope of the present disclosure.

Another embodiment may use fuel cells as the power source. Fuel cell vehicles (FCVs) are currently being developed to significantly reduce dependence on oil, lower harmful emissions, and increase efficiency and capabilities of user vehicles. FCVs typically have a tank or container in the vehicle that stores compressed hydrogen gas or liquid hydrogen. The FCVs typically have a fuel cell stack that uses the hydrogen and oxygen in the air to produce electricity to power an electric motor that propels the vehicle. FCVs and corresponding power sources to be delivered by a vendor are within the scope of the present disclosure. Although fuel cells may be used to power the vehicle, fuel cells and micro fuel cells may be used as a power source for other powered devices such as phones, tablets, and chargers. Replenishing power source for these devices is within the scope of the present disclosure. In one embodiment, such other devices may be operably coupled or connected with a FCV and replenish its fuel or compressed gas via its connection with the FCV and the FCV's corresponding fuel source.

A vendor may include a company, private party, or other person or entity that agrees to contract terms in relation to services or products provided to the user of a vehicle that are requested by a user. In some embodiments, a vendor may provide services and/or products to the user when requested by the user that are described in this disclosure. In some embodiments, a vendor may additionally provide related or unrelated services and/or products to the user other than or different from services request through various embodiments of the present disclosure. For example, a vendor may be an existing gas service station that does the typical work done by a gas service station and also provides services when requested by the user. A vendor may be an automobile dealership that does the typical work done by an automobile dealership and also provides services when requested by the user. A vendor may be an automobile body or engine repair shop that does the typical work done by a vehicle body or engine repair shop and also provides services when requested by the user. In general, a vendor may be a private party, business, or other person or entity that may or may not provide other services while providing services and/or products that are requested by the user as described in this disclosure.

FIG. 1 shows one embodiment of a power source replenishment system 100 of the present disclosure. As shown, power source replenishment system 100 comprises a platform or "app" (as defined further herein) 102, a network 103, at least one vendor device 104 associated with at least one vendor vehicle 106 or at least one power source replenishment station 101, and at least one user device 108 associated with at least one user vehicle 110. The platform 102 accessible via the network 103 by the at least one user device 108 and the at least one vendor device 104. The platform 102 comprises a vendor interface that may be displayed on the vendor device 104. The platform 102 further comprises a user interface that may be displayed on the user device 108. A user may make a request for power source replenishment for one or more of the user vehicles 110 via the user interface displayed on the user device 108. Information regarding the user's request for power source replenishment is then transmitted by the platform to at least one vendor device 104 associated with at least one vendor vehicle 110. The vendor interface displays information regarding the user's request for power source replenishment, and the vendor vehicle 106 may then be deployed to a location of the user vehicle 110 to fulfill the request for replenishment.

FIG. 2 shows one embodiment of a method 200 of replenishing a power source of user vehicle. In at least the embodiment shown in FIG. 2, the method 200 may comprise, as shown at step 202, receiving a user request for power source replenishment services for a user vehicle. At step 204, the user request may be displayed on a vendor device, which may be associated or in communication with a vendor vehicle 110 or a power source replenishment station 101. The user request may be displayed via the vendor interface. In at least one embodiment, the user request may be displayed on one or more vendor devices and a vendor may accept the user request prior to deploying a power source transport vehicle to the user vehicle's location. In some embodiments, the user request may only be displayed on a vendor device of a selected vendor. In some embodiments, the user request may only be displayed on a vendor device based on the location of the vendor device relative to the location of the user vehicle. In some embodiments, the user request may be displayed on a vendor device that coordinates the transportation and/or navigation of the user vehicle to a power source replenishment station based on, for example, factors that may include, but are not limited to, station proximity, power source price, and station capacity. Next, power source delivery may be completed by deploying a vendor vehicle to the location of the user vehicle 206 or alternatively, by user vehicle transportation, such as under control of the user or autonomously or semi-autonomously using a suitable navigation and/or guidance system, to a power source replenishment station 205. At step 208, at least a portion of the power source on the user vehicle is replenished with an amount of power source stored on the power source transport vehicle or power source replenishment station. At step 210, the vendor confirms that the request has been fulfilled and the user pays an amount based at least in part on the amount of power source used to replenish the power source. In any embodiment, "replenishment" of the power source may mean filling a power source reserve on a user vehicle to its capacity (in other words, until the power source reserve is full once again) or only replacing a portion of the capacity of the power source reserve (in other words, an amount more than an initial amount but less than full capacity of the power source reserve). Replenishment may also mean the provision of at least one unit of power source.

A request for power source replenishment can be made by any suitable method including, but not limited to, speaking on a telephone or using a telephone, computer, tablet, vehicle console module, or other device to email, text, or otherwise communicate using some form of electronic messaging method without using what has been commonly referred to as an "app." The request for fuel source replenishment can also be made via an "app" or other software application that is stored or executed on a telephone, computer, tablet, vehicle console module, or other device. In some embodiments, the "app" or other software application may be, alternately or additionally, accessed by the device via a network. The request for fuel source replenishment can also be made via a vehicle console module or, for example, a location detection, remote unlocking, and/or reporting device located on the vehicle. The "app" may be a software tool that facilitates the communication between a user and a vendor. The vehicle console module may be a computer that is installed in the vehicle. The location detection, remote unlocking, and/or reporting device may be installed on a vehicle by, for example, connecting it to a power source within a vehicle, powered through a battery, inserted into an outlet, or plugged into the On Board Diagnostics (OBD) port located within the vehicle. The communication between the user and vender can use any combination of electronic devices and any combination of a speaking voice, email, text, fax, electronic messaging method, "app," or the like.

A vendor's power source transport vehicle and/or the power source replenishment station may use portable containers, tanks or commercial industrial holding tanks affixed to a vehicle frame or building structure, electrical charge capacitors, gas cylinders, or any other type of container, permanent, semi-permanent, or temporary, or other transport system usable or configured to replace, replenish, and/or supplement the user's vehicle power source. Power source reserves can be replenished through the use of hoses, nozzles, tanks, electrical cords, and/or other supplies or tools, which may in some embodiments depend on the power source.

The vendor's power source transport vehicle may be a vehicle that travels on land, water, or in the air. The vendor's power source transport vehicle may be manned or unmanned, controlled inside the vehicle, or remotely, or may have automatic onboard vehicle navigation and/or control systems. The vendor's power source transport vehicle may include, but are not limited to: cars, trucks, SUV's, vans, trains, pontoon boats, cruiser boats, other water vessels, and aircraft, including but not limited to, drones, blimps, balloons, fixed wing aircraft, rotor blade aircraft, and other aircraft. Vendor's power source transport vehicle may also utilize one or more trailers, or other detachable units, used to increase power replenishment capabilities and/or to increase ability to transport other products or to aid the vendor in servicing user vehicles.

Figure 3A:
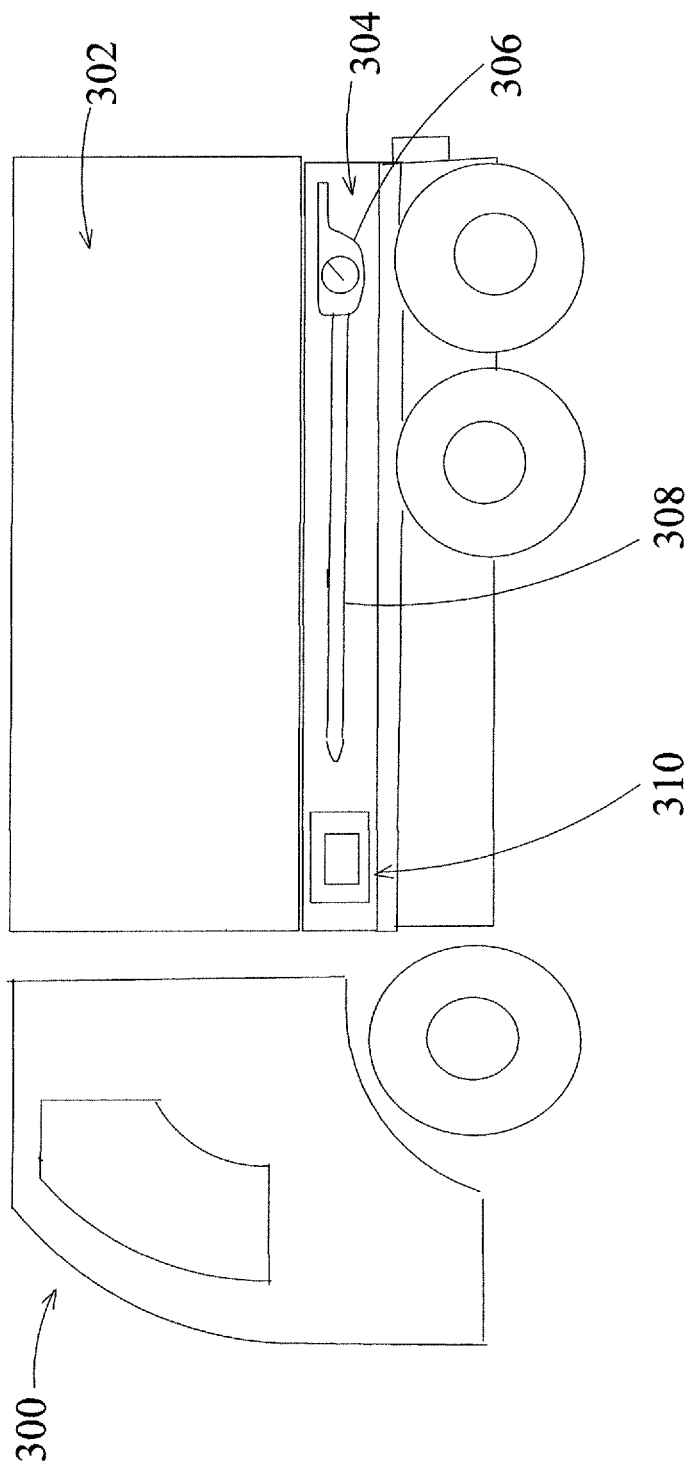
Figure 3B:
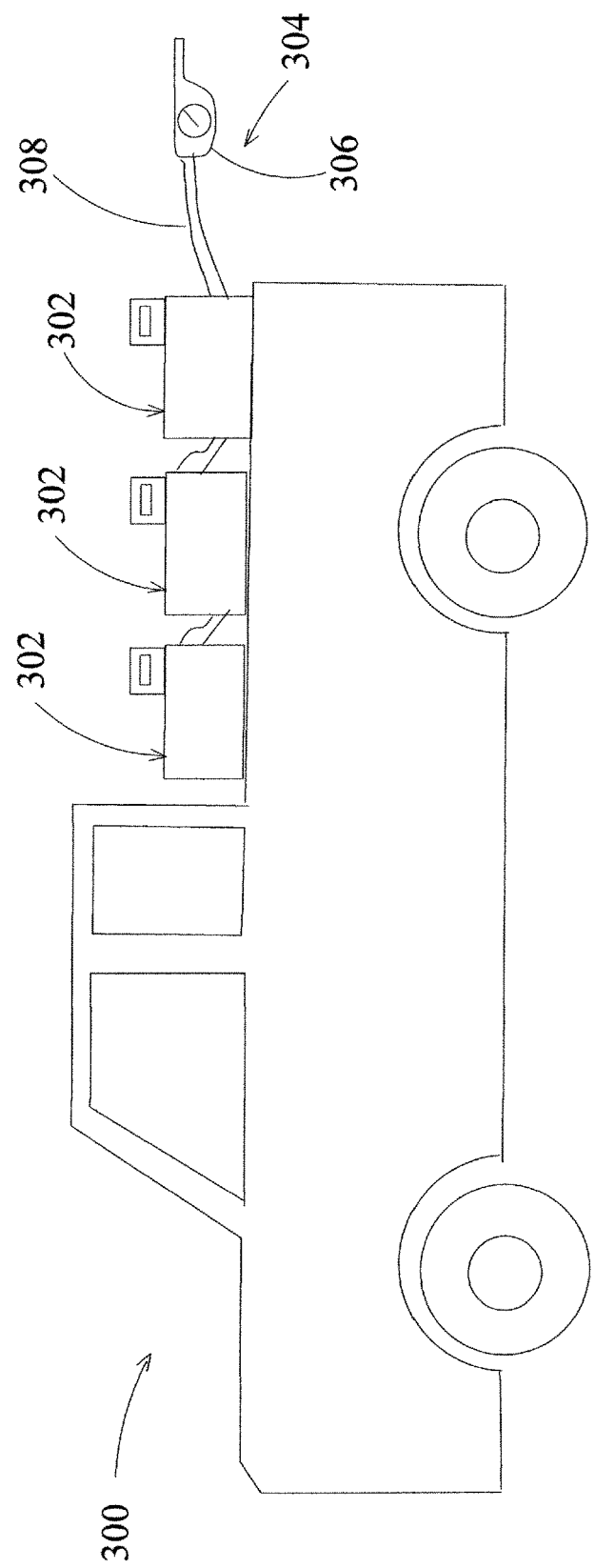

FIGS. 3A-3C show embodiments of power source transport vehicles 300. As shown in these embodiments, power source transport vehicles 300 may comprise at least one power source container 302 and a transfer assembly 304 for transferring the power source from the power source container 302 to the user vehicle. As shown in FIGS. 3A-3C, the transfer assembly 304 may comprise a nozzle 306 and a hose 308 connected to the nozzle 306 and the container 302. In at least one embodiment, the hose 308 may be provided with quick-disconnect connections. The power source transport vehicle 300 may have one power source container 302 as shown in FIG. 3A, or as shown in FIGS. 3B-3C the power source transport vehicle 300 may have multiple power source containers 302. Each power source container 302 may have a transfer assembly 304 or one transfer assembly 304 may be used for all power source containers 302. In at least one embodiment, the power source containers 302 are fixed to the power source transport vehicle 300. Each power source container 302 could carry a different power source or fuel type from any other power source container 302. In at least the embodiments shown in FIGS. 3A and 3C, the power source transport vehicle 300 may have a storage area 310 for storing items requested by the user as part of replenishment request, as will be discussed later in this disclosure. In some embodiments, the power source transport vehicle 300 may further comprise a trailer 312 to provide additional transport capacity for power source containers and/or additional storage space. FIGS. 4A-4B show an embodiment of the power source transport vehicle 400 that has a removable power source container 402. As shown in FIG. 4A, power source transport vehicle 400 comprises a plurality of removable power source containers 402, which in some embodiments may contain different types of power sources or grades of fuel. In some embodiments, the removable power source container may be or carry a battery. In at least one embodiment, removable power source containers 402 allows for portability, for more efficient replacement of power source containers on the power source transport vehicle 400, and/or for flexibility in the availability of power source types and fuel grades on a power source transport vehicle 400. Each power source container 402 as shown may comprise its own transfer assembly 404, which in at least the embodiment shown comprises a nozzle 406 and hose 408. As shown in FIG. 4B, the container 402 may comprise one or more attachment features 414 that engage with features such as the sides of a truck bed on the power source transport vehicle. As shown at least in the embodiment of FIG. 4B, the attachment features 414 comprises recesses that allow the power source container to rest on the sides of the truck bed securely.

For vehicles where the power source is gasoline, diesel, biodiesel, ethanol, isobutanol, methanol, butane, kerosene, propane, natural gas, synthetic fuels, complex hydrides, hydrogen, hydrogen peroxide, and oxygen, a vendor may travel to the location of a user's vehicle and transfer fuel from a vendor container to the user's vehicle. In some embodiments, the power source transport vehicle may leave a power source replenishment unit with the user's vehicle during the power source replenishment process and retrieve it at a later time after the power source has reached full capacity.

For vehicles where the power source replenishment is a battery, a vendor may travel to the location of the user's vehicle and either recharge or replace the battery. In some embodiments, the power source transport vehicle may leave a power source replenishment unit with the user's vehicle during the power source replenishment process and retrieve it at a later time after the battery has reached full capacity. The vendor may alternatively exchange a depleted battery with a full capacity battery. In some embodiments, the vendor may exchange batteries using a crane, hydraulic lift, hoist, dolly, or other lifting or transportation equipment.

For vehicles where the power source includes fuel cells, a vendor may travel to the location of the user's vehicle where the vendor may recharge and/or replace the cells as needed. In some embodiments, the vendor may travel to the location of the user's vehicle where the vendor may recharge and/or replace the tank of compressed hydrogen or other gas. The vendor may use portable tanks or commercial industrial holding tanks affixed to a vehicle frame, electrical charge capacitors, gas cylinders, or any other type of container or transport system usable or configured to replace, replenish, and/or supplement the user's cells and/or compressed gas. Power source reserves may be replenished through the use of hoses, nozzles, tanks, electrical cords, and/or other supplies and tools. In some embodiments, the power source transport vehicle may leave a power source replenishment unit with the user's vehicle during the power source replenishment process and retrieve it at a later time after the power source has reached full capacity. The vendor may, alternatively, exchange a depleted power source with a full capacity power source using a crane, hydraulic lift, hoist, dolly, or other lifting or transportation equipment.

Among standard dictionary definitions and uses of the term, a "power source replenishment access point" may include the specific area on a vehicle where the replenishment power source is input into the vehicle. This area usually has a cap, cover, or panel that covers the area that may be moved or removed prior to adding the replenishment power source. In some cases, the cap, cover, or panel is not locked and in some cases, it can be locked. If locked, a locking mechanism usually can be unlocked from inside the vehicle. In some cases, mechanisms may need to be unlocked at the power source replenishment access point. FIG. 5 shows an embodiment of the power source replenishment access point 500 on a user vehicle. The cover 502 may be removed to expose a cap 504. In some embodiments, a completion tag 510 may be provided that visually indicates to a user that the power source has been replenished. In some embodiments, the completion tag 510 may be secured by at least one of a cap, cover, and/or panel of the power source replenishment access point 500. In at least the embodiment shown in FIG. 5, the completion tag 510 comprises a first portion 512 that surrounds a portion of the cap 504 and a second portion 514 that extends over and edge the cover 502. When the cover 502 has been replaced following replenishment of the power source, the completion tag 510 is visible. In some embodiments, as discussed further herein, the user may order goods or services in addition to replenishment of the power source. In at least one embodiment, the provided goods (shown generally at 518) may be deposited in a container 520 such as a bag. Container 520 may comprise a handle 522 or other feature capable of surrounding at least a portion of the cap 504, as shown in FIG. 5. Therefore the container 520 may be retained by the cover 502 once the cover is replaced, and the goods can be provided securely without the vendor entering the user vehicle.

Figure 34:
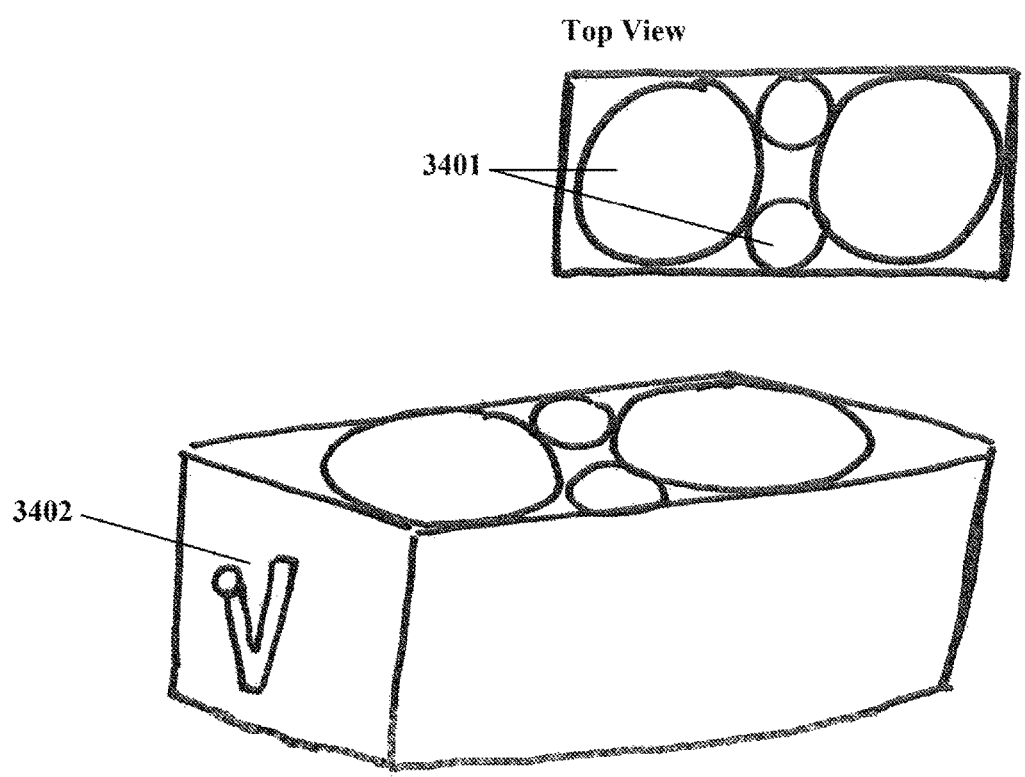
FIG. 34 is a schematic diagram of one embodiment of a power source replenishment station.

In some embodiments, power source replenishment may take place when the user vehicle coordinates with an app to, via navigation by an on-board navigation system, drive, fly, or navigate via waterway to a "power source replenishment station" and receive power source replenishment. Among standard dictionary definitions and uses of the term, a "power source replenishment station" may include a physical location where power source replenishment for user vehicles occurs. These stations may be either mobile or placed in a fixed, more or less permanent or semi-permanent location. The power source replenishment station may have landing zones for aerial user vehicles, as shown by top view 3401 in FIG. 34, docking stations for water vessel user vehicles, or parking zones for ground transport user vehicles. Vendors may use these stations in lieu of or in concert with power source replenishment transport vehicles to provide power source replenishment to a user vehicle.

Figure 35:
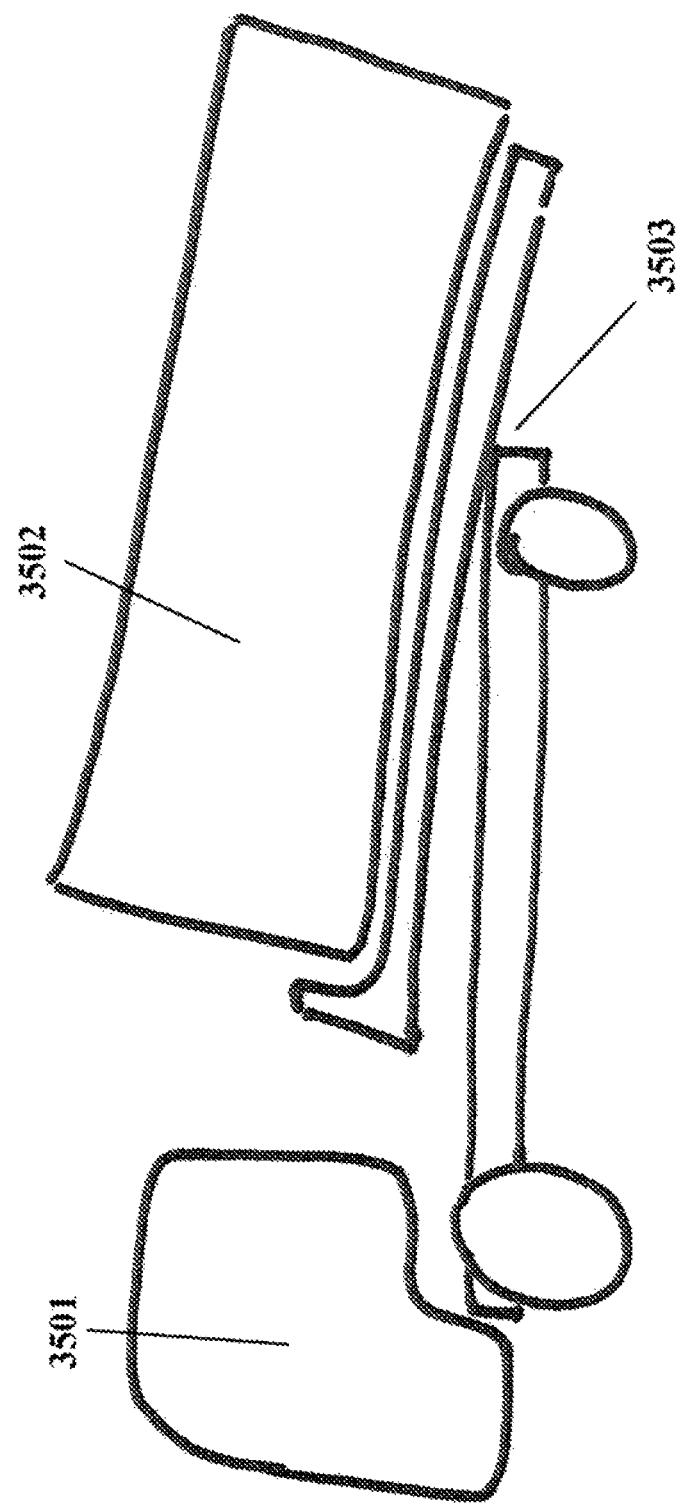
FIG. 35 is a schematic diagram of a tilt-bed truck for transport of power source replenishment stations.

In some embodiments, power source replenishment stations may consist of one or more enclosed, self-contained "units." Each unit may be similar or perform different functions. In one embodiment, one unit provides power source refueling capability and another unit is used for power source storage. Units may utilize recycled shipping containers (ISO), or some other method or material to enclose station mechanics. Power source replenishment units may be transported using a specialized tilt truck shown by FIG. 35, or some other means. Specialized tilt trucks may consist of open-back truck 3501 with power-assisted or manual tilt mechanism 3503, which allows for easier loading and unloading of power source replenishment unit 3502. Units may be placed in a fixed, more or less permanent location, or moved more regularly to accommodate user demand, need, and power source replenishment efficiency. The power source replenishment unit may be placed in traditional locations such as gas station parking lots, or in less traditional places such as mall, park, or commercial parking lots, rest stops, streets, or other public or private spaces. Units may be partially or completely submerged below ground, or integrated into the environment, or left completely exposed.

In some embodiments, power source replenishment of the user vehicle at the power source replenishment station may be performed by a person acting on behalf of the vendor. In some embodiments, power source replenishment of the user vehicle at the power source replenishment station may be performed by the user. In other embodiments, the power source replenishment of the user vehicle may be performed automatically or semi-automatically by the power source replenishment station using robotics or some other mechanical method 3402 shown in FIG. 34. In still other embodiments, the transfer of the power source to the user vehicle may occur using methods used by the vendor power source transport vehicle.

In some embodiments, the power source replenishment station may include a power generation plant which provides full or partial power for station power source demands. Local power generation allows the power source replenishment station to exist completely autonomously, without the need for an outside or exterior power source. In some embodiments, the power generation plant supplies power from the power source supplied to vehicles or from environmental resources such as wind, tidal, solar, or geothermal. The power generation plant may include, but is not limited to: a diesel, gas, or natural gas engine, battery, fuel cell, solar panels, wind turbines, or a geothermal power plant. In some embodiments, the power source replenishment station may convert water to hydrogen, through electrolysis or some other acceptable means, in order to supplement and/or supply hydrogen as a power source for user vehicles. In some embodiments, a vendor transport vehicle may fill its power source replenishment reserves at a power source replenishment station, allowing it to continue providing power source replenishment to user vehicles.

Figure 36:
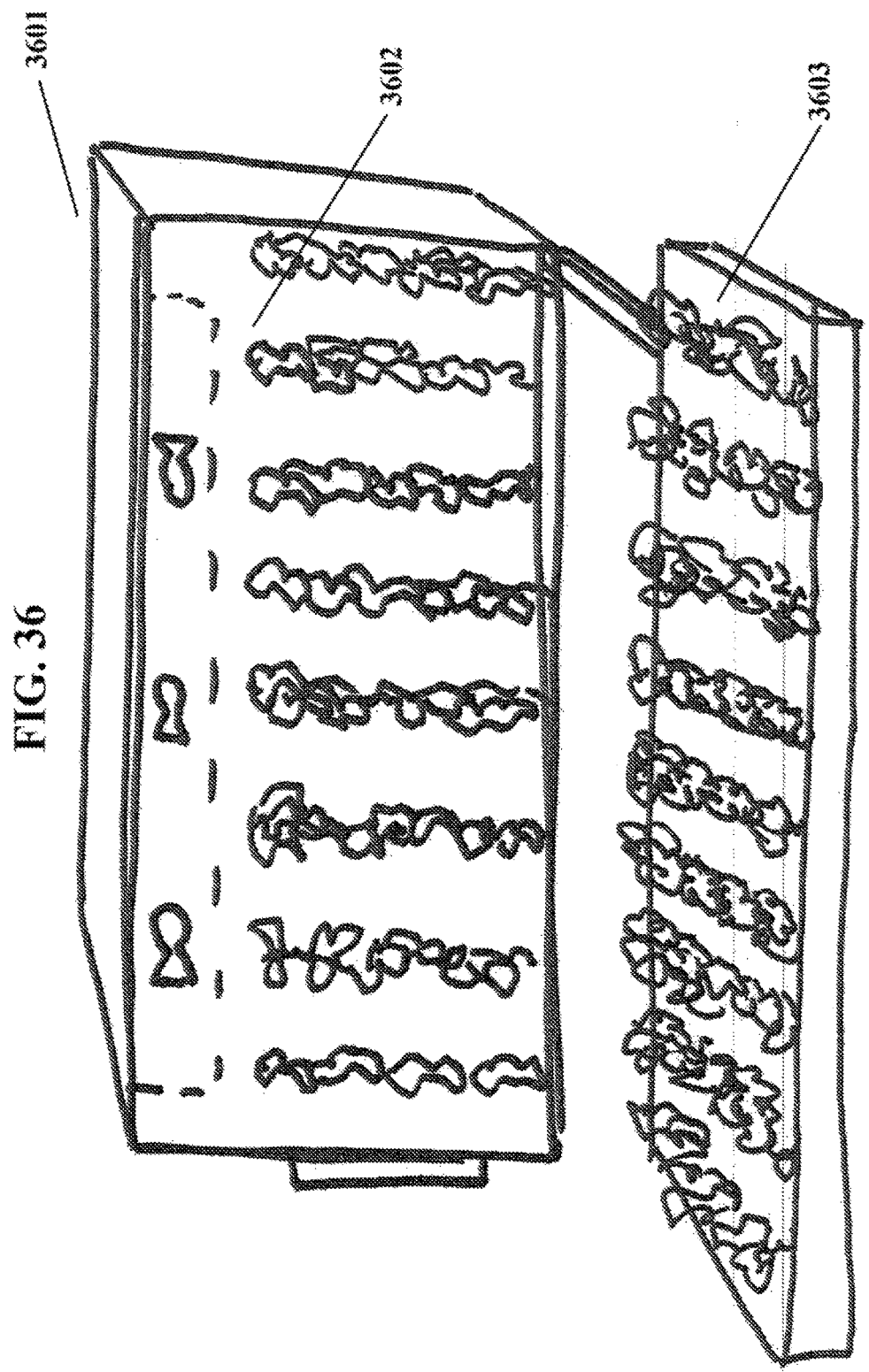
FIG. 36 is a schematic diagram of one embodiment of hydroponics and aquaponics systems incorporated into the design of a power source replenishment station.

In some embodiments, the power source replenishment station may produce by-products which may be used in other applications. In some embodiments, the power source replenishment station may obtain water as a by-product as part of the exhaust from on-board fuel cells and/or as part of the user vehicle replenishment process, and/or as a delivery to the power source replenishment station by the vendor and/or some other source, in order to sustain aquaponics and/or hydroponics systems. These hydroponics and aquaponics systems may be coupled with power source replenishment systems to harvest fish, fruits, and/or vegetables for human and/or animal consumption, as shown in FIG. 36. In some embodiments, plants may grow on side 3602 and/or the base of power source replenishment station 3601 and/or in additional grow bed 3603, each of which may be incorporated into the power source replenishment station design and configuration.

In any embodiment, the vendor may also perform services that are recommended or required as part of the fuel replenishment process, such as, but not limited to, cleaning, flushing, and replacement of components, or other preventive maintenance and repairs of the power source system.

After power source replenishment has been ordered or generally at the same time as it is ordered, or during a separate order made without requesting power source replenishment, the user may request one or more convenience or maintenance services or products from a vendor. Some services offered may include, but are not limited to: an oil change, snow and ice removal from windows and windshields, exterior and interior cleaning, removing trash from the vehicle, vehicle inspections, starting vehicles to warm them up in cold weather, battery jumps, washer fluid replenishment, engine coolant replenishment, transmission fluid replenishment, air filter replacement, tire pressure checks and inflation service, windshield chip repair, wiper blade replacement, dent repair, paint repair, other detailing instances, and other minor maintenance prevention and/or repair services. Some products offered by a vendor that can be placed inside a user's vehicle or at some other suitable location, may include, but are not limited to items such as cold or hot water, coffee, tea, hot chocolate, coffee or other drinks, frozen or non-frozen trays of food, snacks, pastries, newspapers, personal hygiene products, air fresheners, and vehicle related products such as oil, window wipers, wiper fluid, etc. In one embodiment, a vehicle may have a fluid tank, container, vessel, or other receptacle for receiving water or other fluids that may be replenished during fulfillment of a user request.

In at least one embodiment, the user's telephone, computer, tablet, or other device may have GPS technology to generally easily locate the user vehicle. Likewise, the user vehicle console module or a location detection, remote unlocking, and/or reporting device may have GPS technology to generally easily locate the user's vehicle. A location detection, remote unlocking, and/or reporting device may also have the ability to unlock the user vehicle and/or the power source replenishment access point, and may have user vehicle reporting capability. In another embodiment, the user can create settings for when, where, and how often the GPS location coordinates for the user vehicle are shared by or on all devices that have GPS technology. In some embodiments, location detection technology and navigation or guidance software may be used to facilitate the transportation of a user vehicle to and from an appropriate power source replenishment station.

Software may be added to the vehicle console module and/or to a location detection, remote unlocking, and/or reporting device to provide information on the amount of power source in the vehicle, the percent of full capacity of the power source that this represents, and/or the number of miles and/or time that the user can drive before the power source is fully depleted. The vehicle console module and/or the location detection, remote unlocking, and/or reporting device may alternatively or additionally provide other information about the power source of the vehicle and may send alerts, reminders, odometer readings, vehicle error codes, or other reports to the user and/or vendor regarding vehicle repairs or maintenance recommended or needed.

An "app" or application of the present disclosure, in one embodiment, may be stored on, executed on, and/or accessed from a telephone, computer, tablet, vehicle console module, location detection, remote unlocking and/or reporting device, or other electronic device. The "app" or application may be accessible over a computer network, such as the worldwide web. The term "platform" is used herein to refer to any of the various formats by which a user may interact with a vendor. Not all embodiments of features available on one platform may be available in the same form on another platform, such as on the Internet. In some embodiments, a user may input information that can be stored by the platform and, in some cases, only needs to be input once. In some embodiments, a platform can be programmed to receive input of information by selecting from a menu of options, drop down boxes, and/or icons in order to reduce the amount of information requiring typed entry. The platform or "app" may have a user interface and/or a vendor interface.

In one embodiment, the user may input vehicle identifying information for at least one vehicle. For instance, the user may input the year, make, model, tail number, registration number, and/or license plate of the at least one vehicle. In some embodiments, the user may input information regarding the vehicle replenishment point, such as, but not limited to, whether the vehicle replenishment point has a fuel tank cap, cover, and/or panel lock, whether the vehicle replenishment point has a lock and/or how to unlock it, and other details on how to access the replenishment point. In at least one embodiment, information regarding the vehicle replenishment point may be automatically retrieved based on the vehicle identifying information. In some embodiments, the user may input power source information, which may include, but is not limited to, the power source type, fuel grade, fuel concentration, or fuel type. In at least one embodiment, the power source information may be automatically retrieved based on the vehicle identifying information. If a vehicle uses batteries as the power source, the user may select options regarding the recharge and/or replacement process and/or charge rate. If the vehicle requires another type of power source, the user may select specific options related to the type of power source.

In one embodiment, the user vehicles are identified by year, make, and/or model. When the user selects one of the user vehicles listed, options for power source replenishment types may be displayed to the user. The user may then select one of the options for power source replenishment, including replenishment by both vendor transport vehicles and navigation to a power source replenishment station. In at least one embodiment, the user may then select a specific day and time for the service. In at least one embodiment, the user may select that the service should be a recurring event. When a vehicle occupies a certain area or "zone", the user may be able to select immediate or urgent replenishment. In some embodiments, the user may select the recurring service to replenish the power source based on any other suitable characteristic of the vehicle and/or power source. In one embodiment, the user can also request via the "app" or platform to have the replenishment take place on a periodic basis that specifies the day or days of the week and the time(s) of day and the location of the vehicle for replenishment. The periodic basis could be daily, weekly, monthly, biweekly, bimonthly, etc. This type of replenishment may be most applicable to vehicles that park at a specific location on a predictable schedule, however, such is not a requirement. Replenishment may also be selected to automatically occur based on any other suitable characteristic of the vehicle and/or power source such as, but not limited to, when power source reserves reach a specific percentage of total power source capacity.

Once the user has input the information into the platform, an order page may summarize the order. The order page may ask the user to confirm the user's selections. After the user has confirmed the order, a confirmation page may appear to confirm the order. The confirmation page may also remind the user to leave the power source replenishment cover, cap and/or panel open, accessible, and/or unlocked if the vendor does not have the ability to unlock the replenishment access point. The confirmation page may also remind the user to leave the vehicle unlocked if the vendor needs to get inside of the vehicle and the vendor does not have the ability to unlock and access the inside of the vehicle.

A suitable vendor, or one of its agents, may then be dispatched via the platform to deliver the requested services and/or products. Any products purchased may be placed in the vehicle, in an appropriate container, whether insulated and/or climate controlled, in a bag or box, tank or other suitable vessel and/or located in a convenient and/or appropriate location for access and/or use. A vendor may measure the amount of power source replenishment provided to user via a gauge, meter, voltage reader, scale, or some other industry approved means to accurately measure the power source quantity. After the power source has been replenished and/or replaced and the delivery of any other products and services have been completed, the vendor may complete an invoice showing, for example, vehicle identification information, time and location of delivery, and the costs of supplies and labor. The user may request that this invoice be sent via message within the platform, via hard copy sent in the US mail, via fax, via email, via text, or via another suitable electronic form. In one embodiment, a tag, receipt, or paper slip may be left protruding from the power source replenishment access point cap, cover, and/or panel, or windshield, or vehicle door, or left in some other suitable location in order to remind and provide notice to the user that service has been completed.

In some embodiments, the platform may have a messaging feature, which is capable of sending and receiving messages to the vendor, such as to power source transport vehicle drivers and/or other employees of the vendor. Drivers may send messages to a user regarding, but not limited to: details about the service completed, vehicle condition and/or location, weather conditions, and/or other conditions or situations within the local environment. On board diagnostic code errors, routine maintenance recommendations, or reminders for the vehicle may be communicated via messages to a user, vehicle manufacturer, and/or vehicle mechanic. A user may have the option to have messages shared via text messages, sent via email, and/or sent via other electronic forms.

Figure 6:
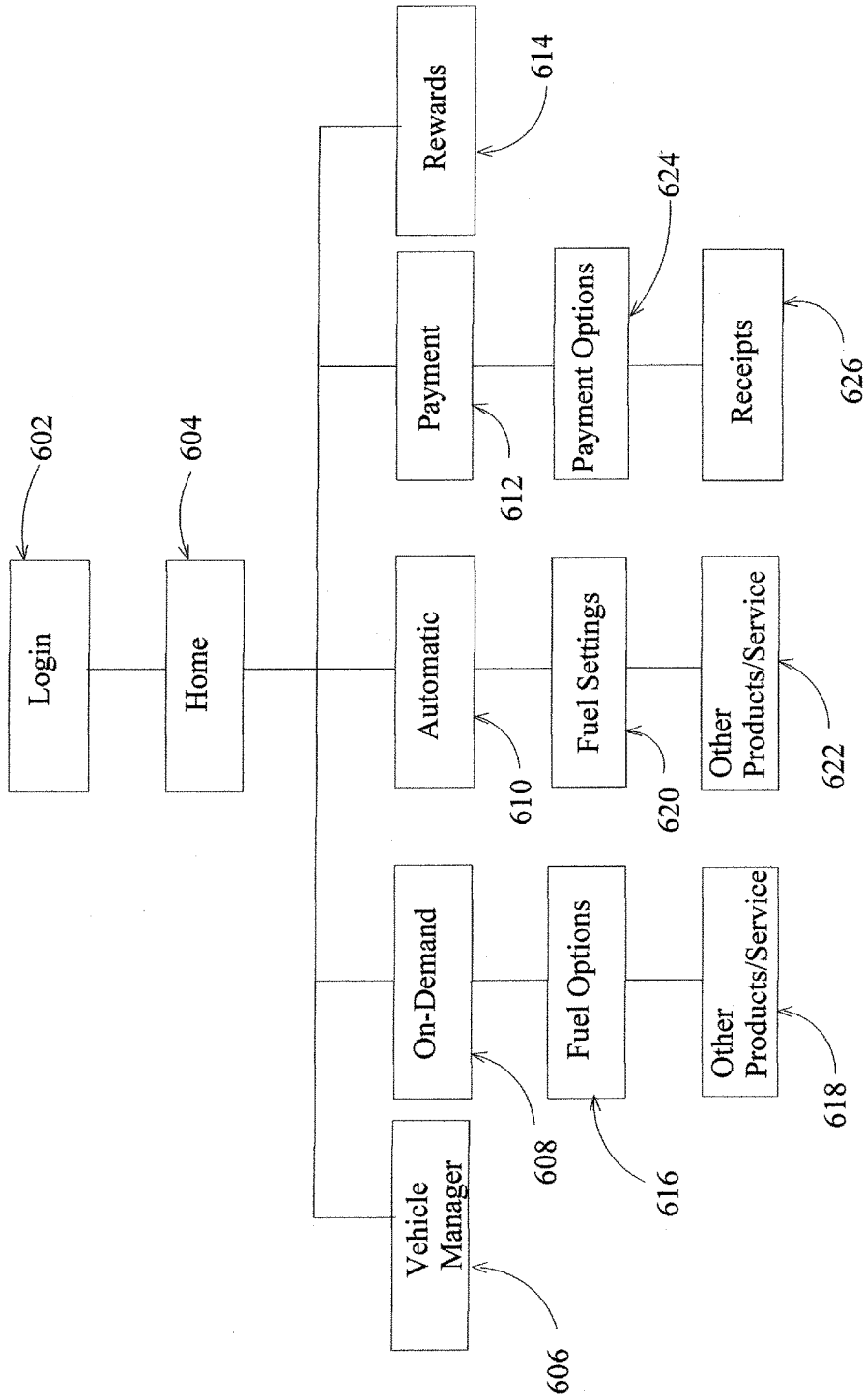
FIG. 6 is a flowchart of one embodiment of a user interface.

FIG. 6 shows one embodiment of a user interface 600 for the platform. User interface 600 may comprise a login screen 602, and once the user logs in with user credentials, a home screen 604 may be displayed. From the home screen 604, the user may select from a number of options, which may include, but are not limited to, managing vehicle information as shown at 606, placing an on-demand request for power source replenishment as shown at 608, creating or editing an automatic or scheduled request for power source replenishment as shown at 610, retrieving information regarding payment as shown at 612, and/or review or manage rewards information as shown at 614. When placing the on-demand request as shown at 608, the user may at least select from power source options for the request, as shown at 616, and/or select other products or services to be performed by the vendor, as shown at 618. When placing the automatic request as shown at 610, the user may select from power source settings for the automatic request, as shown at 620, and/or select other products or services to be performed by the vendor, as shown at 622. The user may retrieve payment information as shown at 612, which may provide the user with the ability to update payment information or payment options as shown at 624. The user may also be able to retrieve receipts from completed on-demand requests and/or automatic requests, as shown at 626.

In some embodiments, the user may review or manage rewards information, as shown at 614. The user interface may have a "rewards" tab, which may show a user's earned rewards, progress towards earning a reward, and/or information about how to earn rewards or other related information. For example, in some embodiments, a reward may be issued such that for a first number of gallons or units of power source purchased by a user, a second number of gallons or units of power source are donated to persons or nonprofit organizations within the community. Alternatively, or additionally, in some embodiments, a reward may be issued such that for a first number of gallons or units of power source purchased by a user, a second number of gallons or units of power source are donated to a low income family. Alternatively, or additionally, in some embodiments, a reward for a particular number of gallons or units of power source purchased, a number of gallons or units may be provided to the user at no cost. These rewards are provided as examples of rewards that may be available, and there are other rewards which are contemplated and within the scope of the present disclosure.

Figure 7:
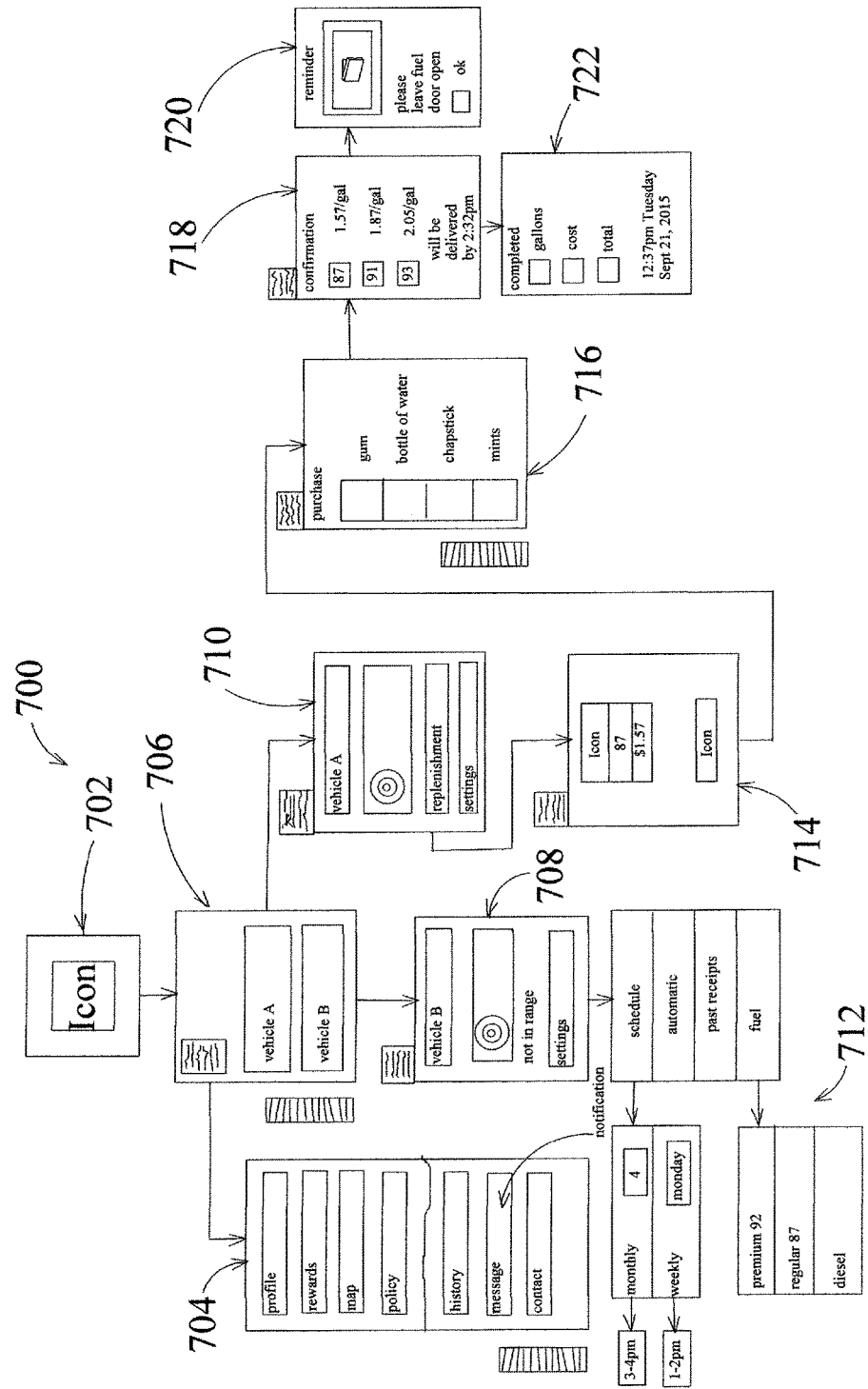
FIG. 7 is a schematic flowchart of one embodiment of a user interface.

FIG. 7 shows another embodiment of a user interface 700 for the platform. User interface 700 may comprise a login screen 702, and once the user logs in with user credentials, a home screen 704 may be displayed. From the home screen 704, the user select from a number of options, which may include, but are not limited to profile information, rewards information, maps, policy or legal information, order history information, messaging, or contact information. At least one option is an option to place a user request for a replenishment service. To place a user request, the user may select a vehicle from a vehicle screen 706. The user may place an automatic or recurring user request as shown at 708 or an on-demand user request as shown at 710. When placing the user request, a map of the vehicle's location may be displayed to the user. In some embodiments, if the vehicle's location is within range of one of the vendor's power source transport vehicles (or within the "zone"), the user may select an on-demand user request, as shown at 710, schedule a future request, or set up an automatic request. If the vehicle's location is not within range of one of the vendor's power source transport vehicles (or within the "zone"), in some embodiments, the user may only be able to schedule a future request or set up an automatic request, as shown at 708, 712. In some embodiments, a power source transport vehicle may only be assigned to a user request if it is within range, in other words that the power source transport vehicle is within a certain distance of the location of the user vehicle. When placing a scheduled request or an automatic request, as shown at 712, the user may set up the frequency of the request, the time of the request, and may select from power source options for the request. In some embodiments, the user may select other products or services to be performed by the vendor. When placing the on-demand request as shown at 710, the user may also select from power source options, as shown at 714. The user may also select other products or services to be performed by the vendor, as shown at 716. The user may receive confirmation that the order was placed as shown at 718. In some embodiments, the platform may send a reminder to the user to release the locking mechanism for the power source replenishment access point or to leave the cap or cover open. In some embodiments, the user may receive confirmation that the power source was replenished, which may include the amount of power source deposited, as shown at 722.

If the user vehicle does not have a locking mechanism for the power source replenishment access point, the access point may typically be accessible and the vendor can readily open the access point and replenish the power source. If the vehicle has a locking mechanism for the power source replenishment access point and it can be unlocked from within the vehicle, there are different ways to give the vendor access to the inside of the vehicle. One way is for the user to ensure that the vehicle is unlocked at the time of the replenishment. Another way is that the user may give the vendor information on where a remote unlocking device for the vehicle is located, and the vendor may access the remote unlocking device to unlock the vehicle. Another way is that the user can allow the vendor to integrate vendor software into the vehicle console module to be able to unlock the vehicle. Another way is for the vendor to attach a location detection, remote unlocking, and/or reporting device to the vehicle to be able to unlock the vehicle and/or the power source replenishment access point.

Figure 8:
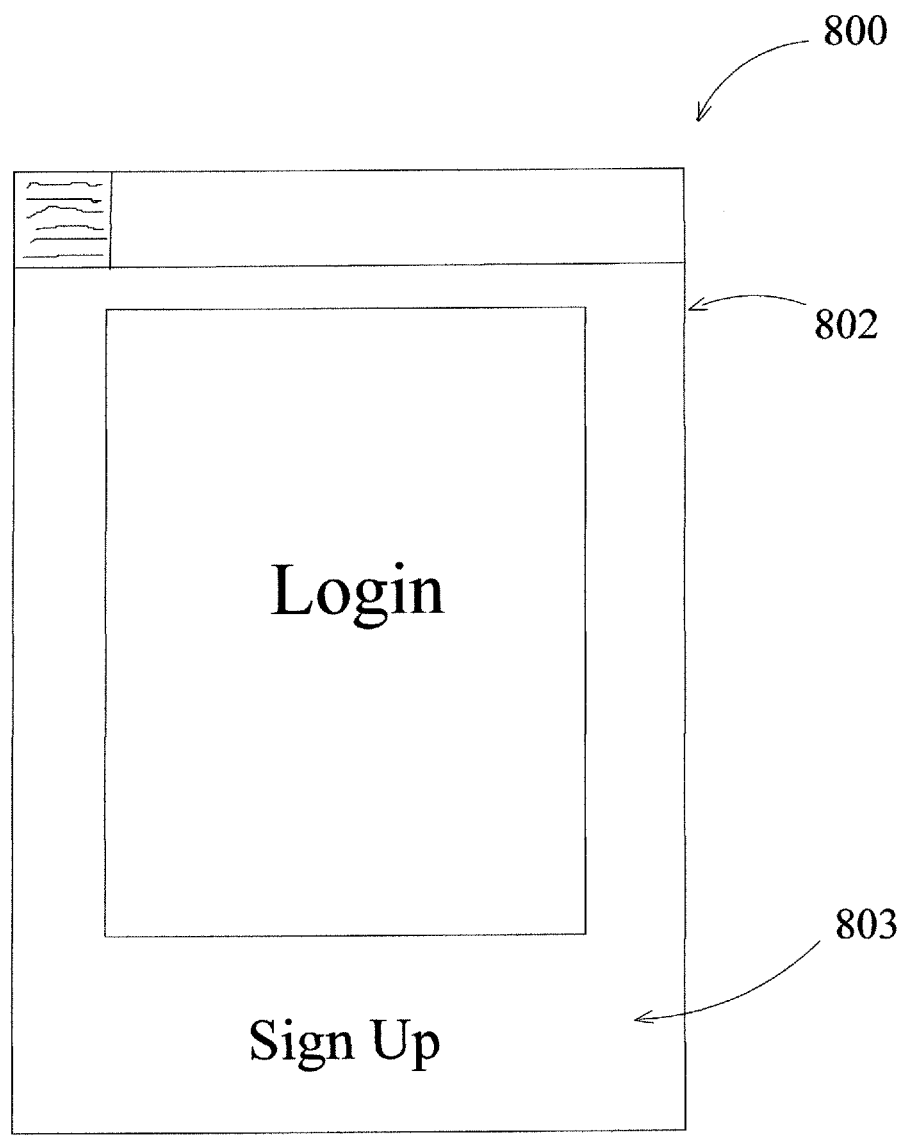
FIGS. 8-31 are views of screenshots of one embodiment of a user interface as displayed on a user device.
Figure 9:
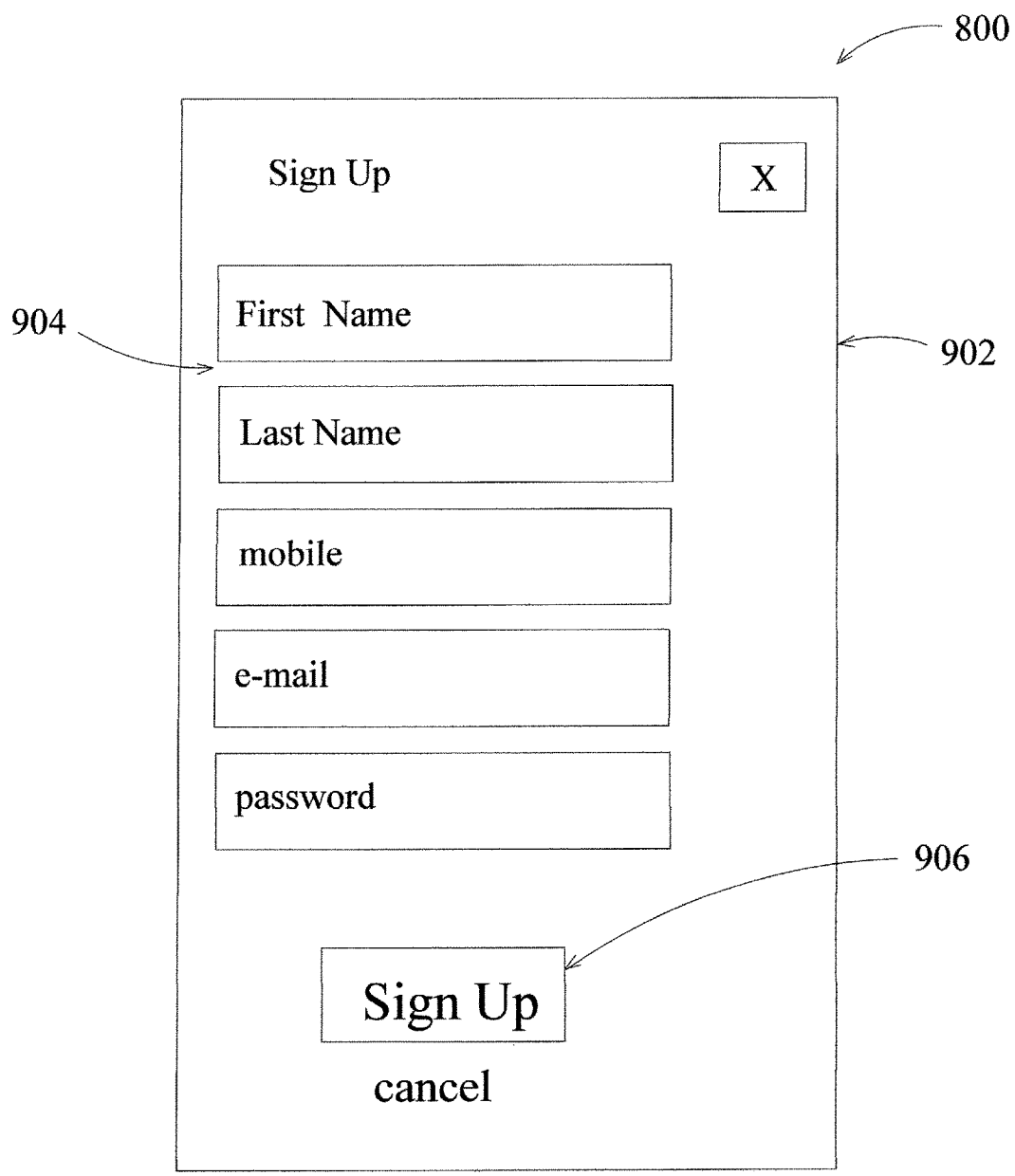

FIGS. 8-31 show another embodiment of the user interface 800. FIG. 8 shows a login screen 802 that may allow a new user to sign up to use the replenishment service as shown at 803. FIG. 9 shows an embodiment of a signup screen 902, where the user may input user identifying information as shown generally at 904. This user identifying information may include name, phone number, email address, username and/or a password. The user may confirm the information by selecting the signup option at 906.

Figure 10:
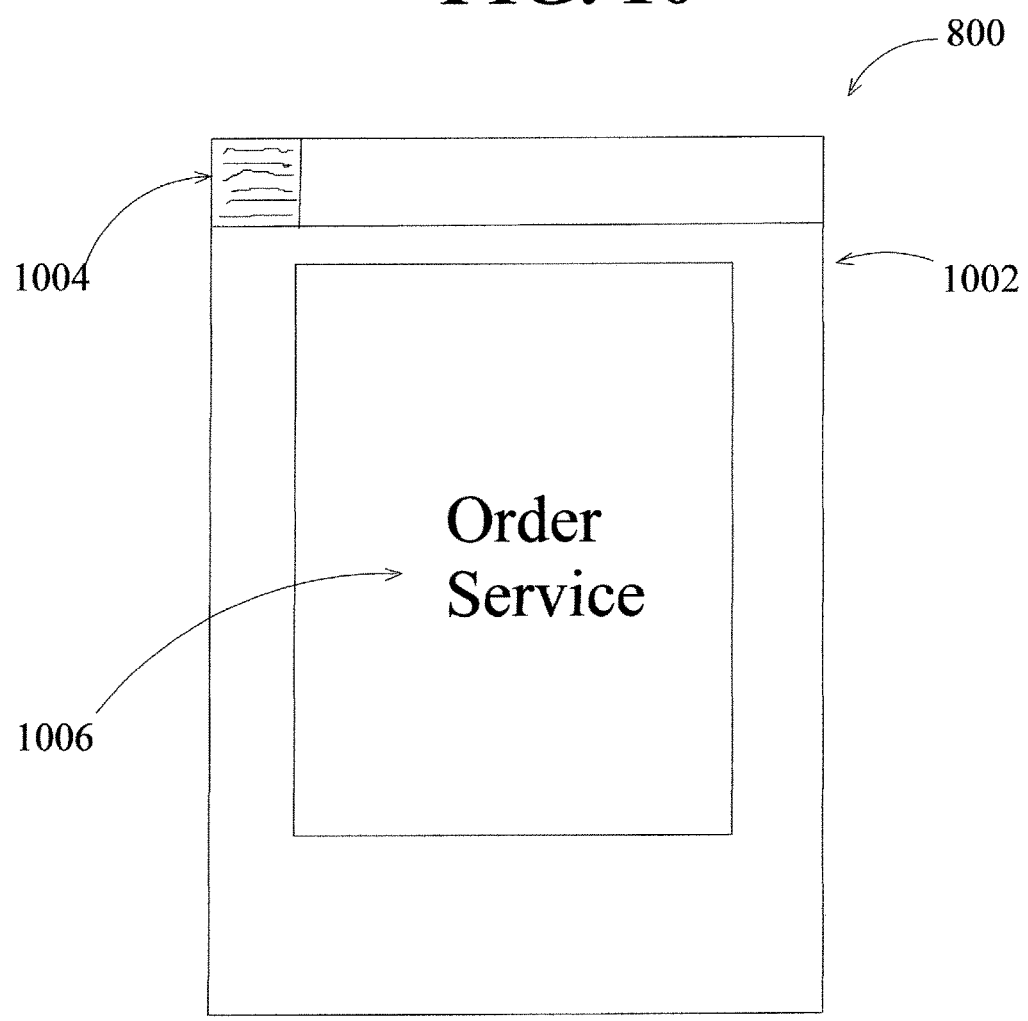
Figure 11:
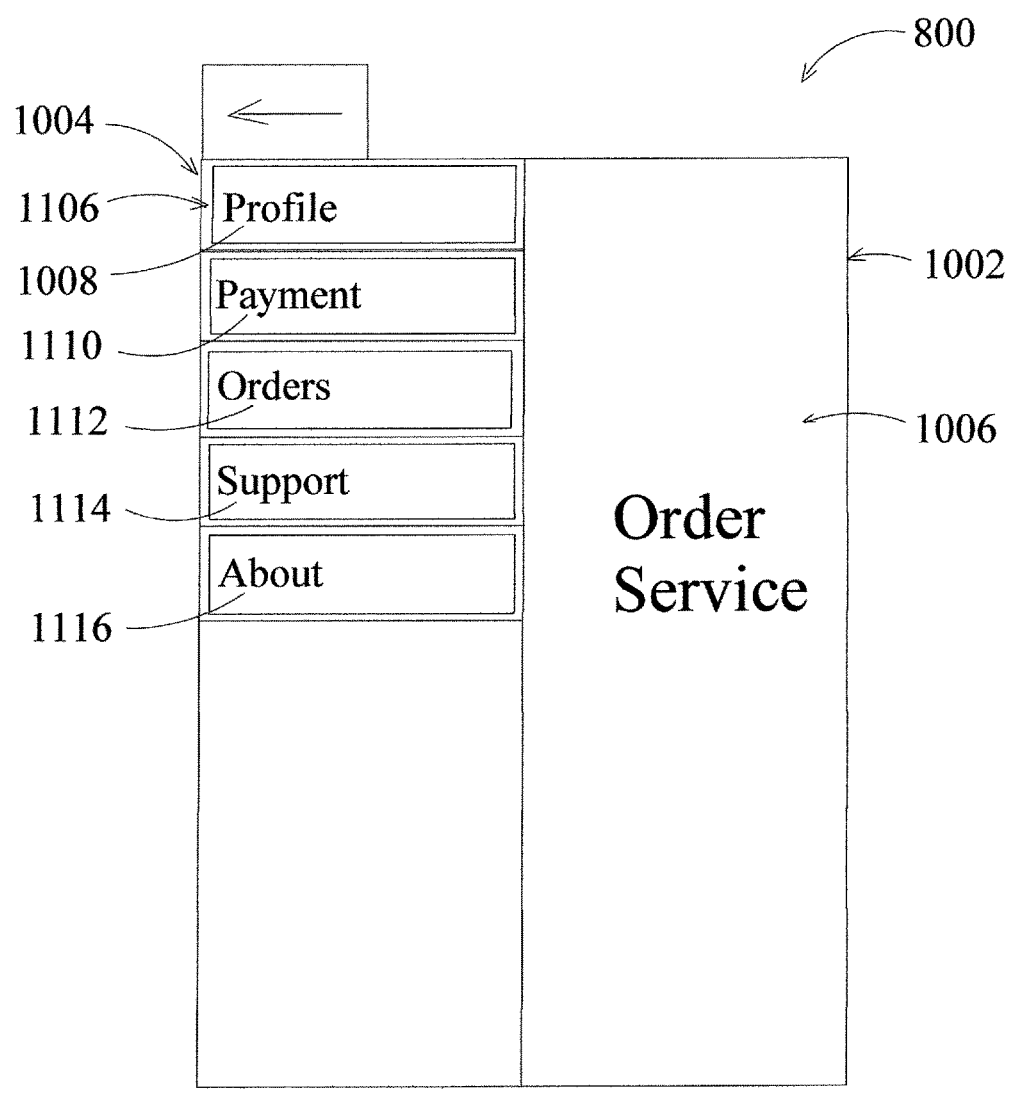

FIG. 10 shows one embodiment of a home screen 1002 for the user interface 800, which has a menu feature 1004 and an order feature 1006 for setting an on-demand replenishment order, an automatic replenishment order, and/or a scheduled replenishment order. FIG. 11 shows the home screen 1002 with the menu feature 1004 expanded to show a number of tabs 1006. In at least one embodiment, the user vehicles may be listed on the home screen, and in one embodiment, the vehicles are listed at the bottom of the home screen. The user interface may have one or more tabs 1106 that divide or format the various types of information for effective communication between the user and vendor. As shown in FIG. 11, the menu feature 1004 includes a "profile" tab 1108, a "payment" tab 1110, an "order" tab 1112, a "support" tab 1114, and an "about" tab 1116. Other tabs may be included to categorize, divide, or format information for effective communication and display of information to the user. Each of these tabs, when selected by a user, may display information to the user. In at least one embodiment, the platform may have a "map" tab. The "map" tab may provide information for one or more vehicles regarding past or present location, at least one past power source replenishment location, and/or vehicle travel path information.

Figure 12:
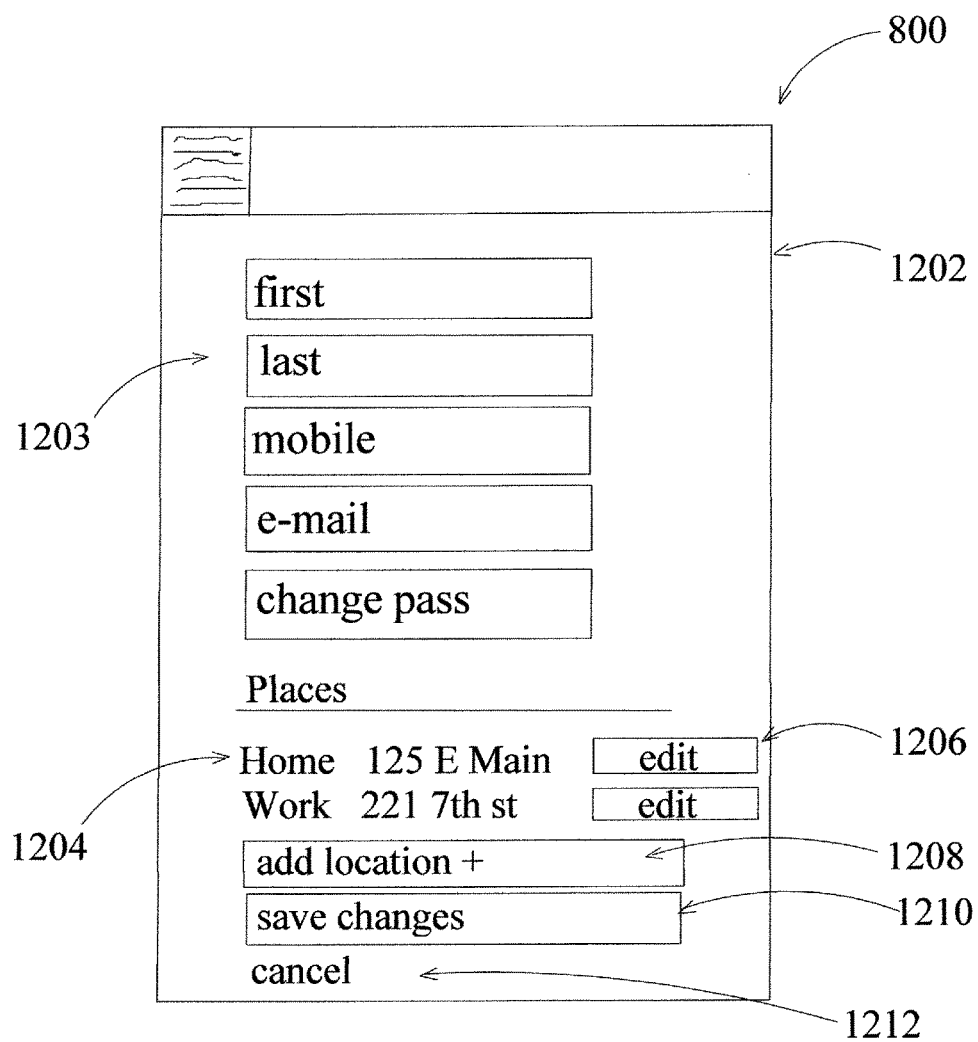
Figure 13:
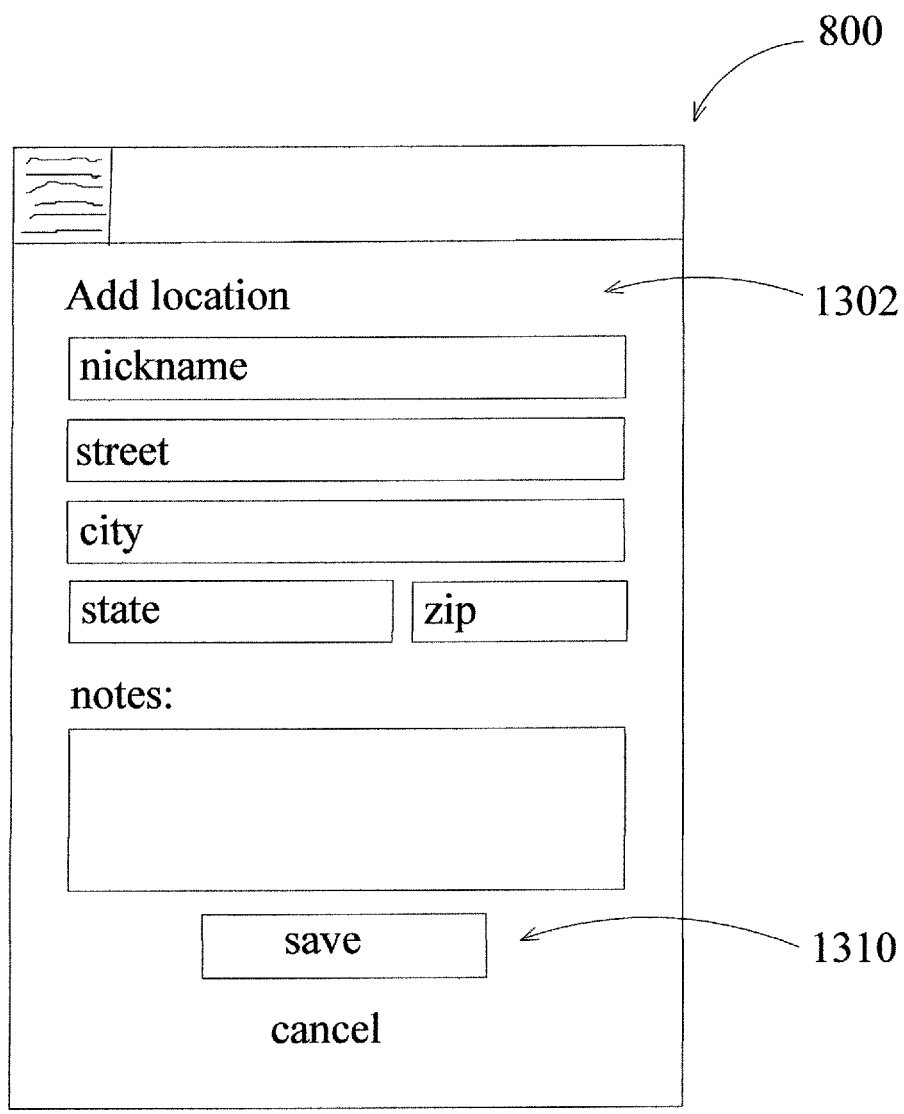

In one embodiment, as shown in FIG. 12, the user interface 800 may have a profile screen 1202, which may be accessed by the user by selecting the "profile" tab 1108 shown in FIG. 11. In at least one embodiment, the profile screen 1202 displays at least one of profile information 1203 and location information 1204. The profile screen 1202, for example, may display profile information 1203 that the user may input and/or edit. The profile information ensures and maintains security when accessing the platform. The profile screen 1202 may permit or require that the user create a username and password and input the user's full name and email address. The platform may give the user the option to change the username and password. The user may have the ability to upload a personal picture and make color and graphics changes. The profile tab may list at least one vehicle of the user and may include an option to add or edit information for the at least one vehicle. As shown in FIG. 12, the profile screen 1202 may also include one or more user locations, shown generally at 1204, and in at least one embodiment, the user has the option to edit one of the locations, as shown at 1206, or input additional locations at 1208. The user may save all changes made to the profile, including the locations, by selecting the save feature 1210. The user may cancel all changes made to the profile, including the locations, by selecting the cancel feature 1212. FIG. 13 shows at least one embodiment of a location screen 1302 accessed by the user in at least one embodiment by selecting the location input feature 1208 on the profile screen 1202. A user may add a name for the location, the address for the location, and/or notes. In at least one embodiment, the notes may be viewable by a vendor or a driver of a power source transport vehicle. The user may save all changes made to the profile, including the locations, by selecting the save feature 1310.

Figure 14:
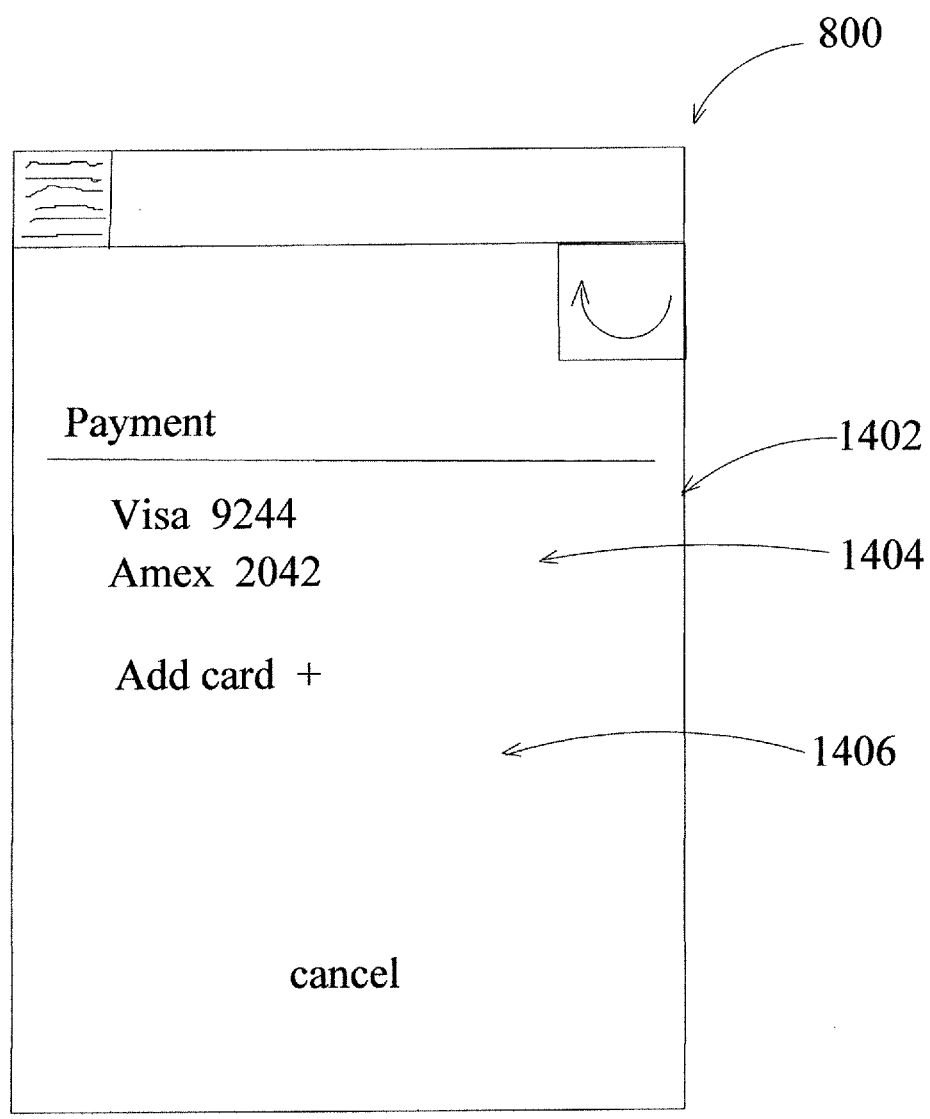
Figure 15:
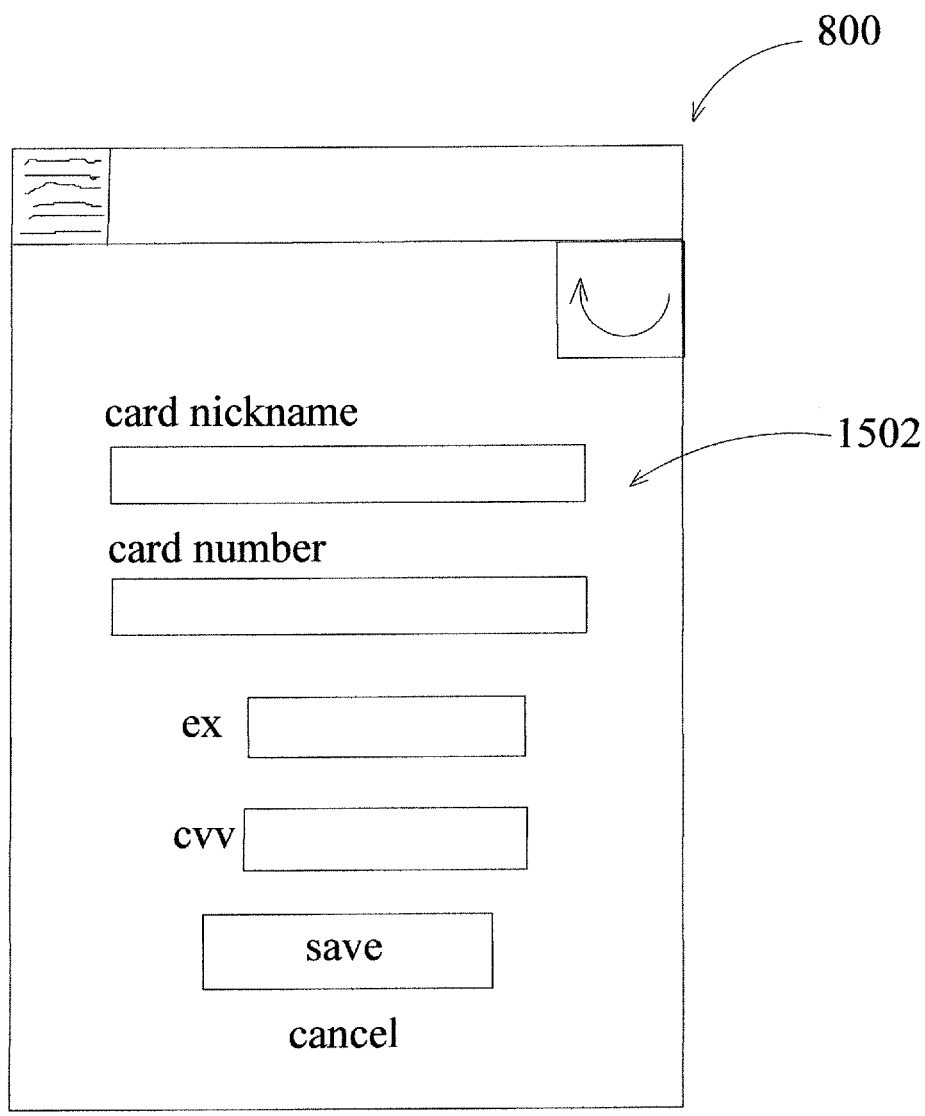

In one embodiment, as shown in FIG. 14, the user interface 800 may have a payment screen 1402, which may be accessed by the user by selecting the "payment" tab 1110 shown in FIG. 11. The user may enter and/or edit electronic payment information as shown generally at 1404. A user may enter debit or credit card information, bank account information, online money transfer account information such as PayPal™ account information, or other form of electronic payment information. The user may select an option to save or not save payment information. For companies or organizations with multiple users, in some embodiments the payment tab provides information to allow the user to charge a charge account for the company or organization associated with the user. The payment screen 1402 may allow a user to enter new payment information, as shown generally at 1406. FIG. 15 shows at least one embodiment of a payment method information screen 1502 accessed by the user in at least one embodiment by selecting the location input feature 1406 on the payment screen 1402. A user may add a name for the payment method and any suitable information for processing a payment via the payment method such as a card number, expiration date, and security code.

Figure 16:
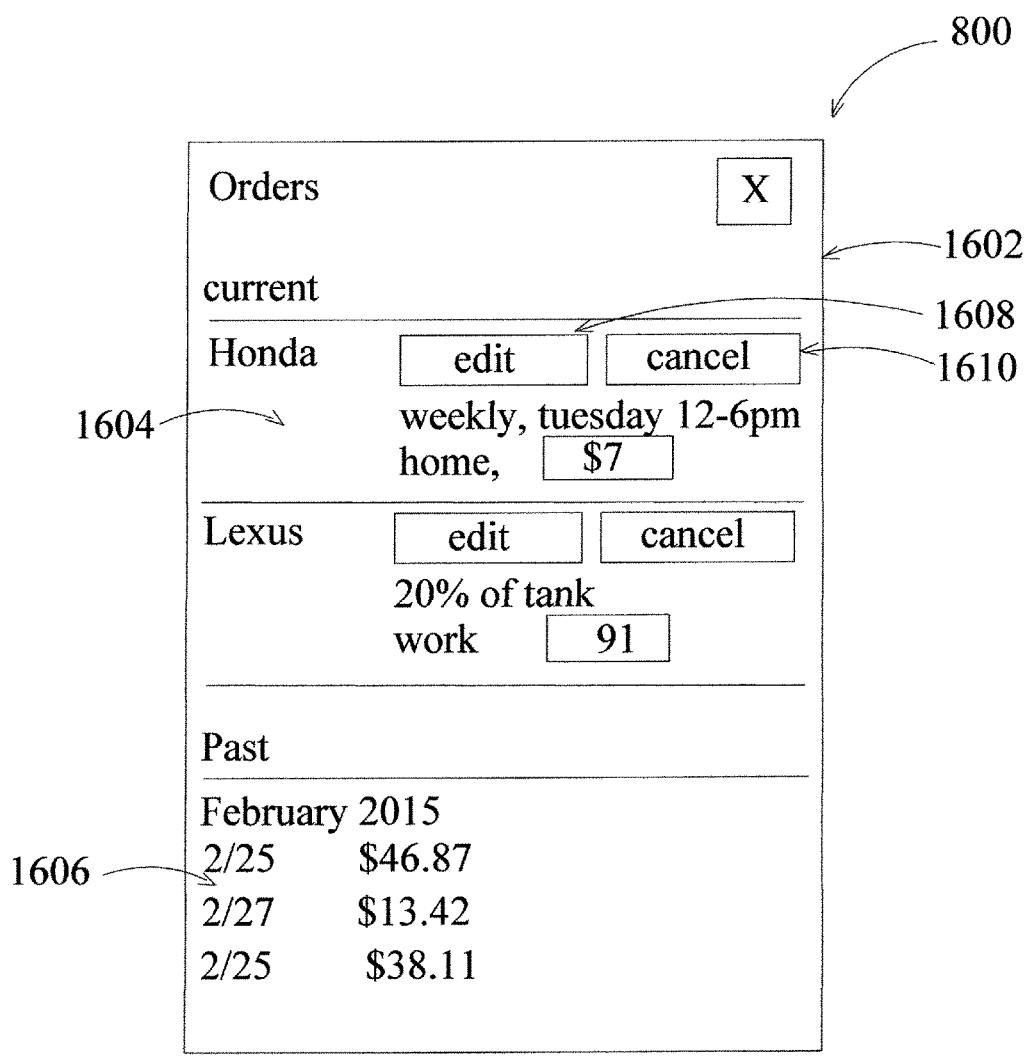

In one embodiment, as shown in FIG. 16, the user interface 800 may have an order history screen 1602, which may be accessed by the user by selecting the "orders" tab 1112 shown in FIG. 11. The order history screen 1602 may display current order information, as shown generally at 1604, and/or historical order information, as shown generally at 1606. In at least one embodiment, one or more of the current order information displayed at 1604 is a pending order. In at least one embodiment, the user may edit a pending order, as shown at 1608, or cancel a pending order, as shown at 1610. In at least one embodiment, the user may edit or cancel a recurring order. The user may be able to retrieve invoices for completed orders from the order screen for the historical order information shown generally at 1606. Each invoice may, for example, show a description of the vehicle, location at the time of service, date of service, power source description of the vehicle, cost of power source replenished, and/or costs for other services. Another embodiment may additionally provide the user with the option not to save past invoices.

Figure 17:
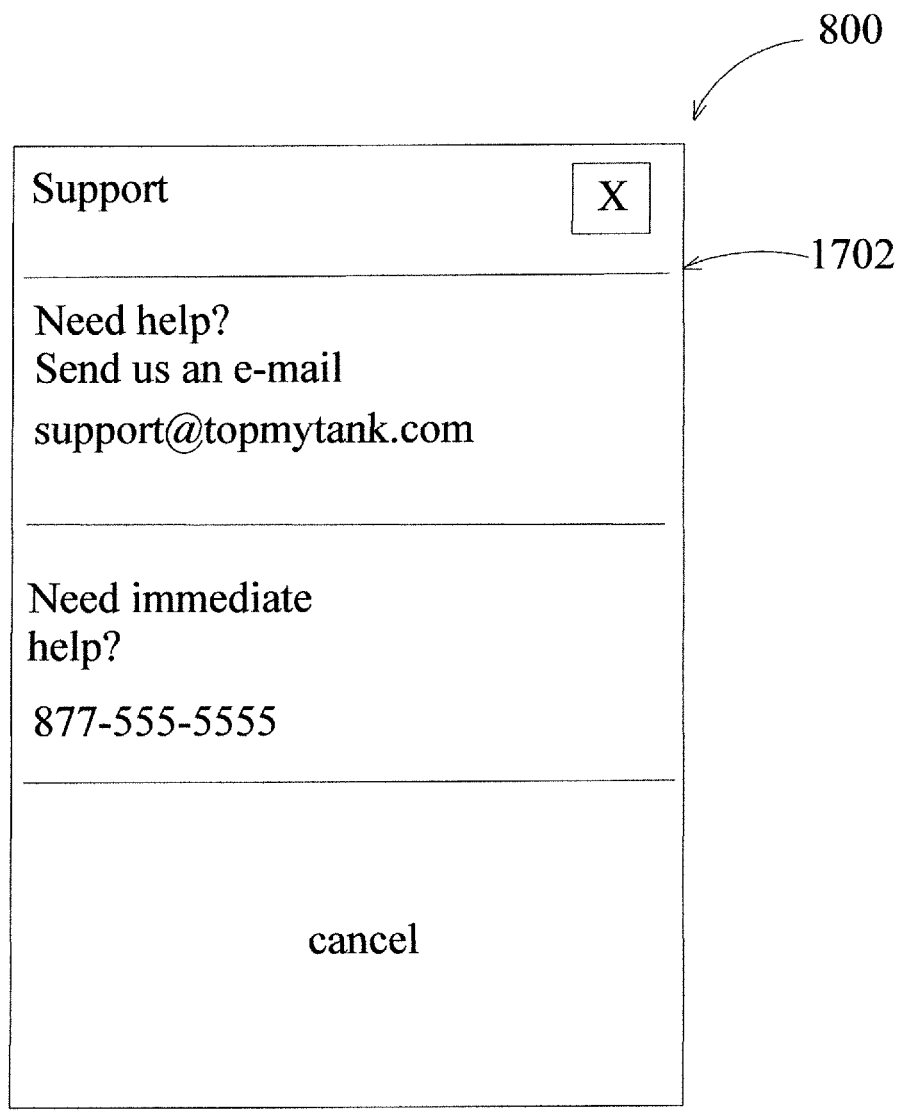

In one embodiment, as shown in FIG. 17, the user interface 800 may have a support screen 1702, which may be accessed by the user by selecting the "support" tab 1114 shown in FIG. 11. In some embodiments, the support screen 1702 provides the user with information or with messaging capability to the vendor or the platform manager to ask questions, raise concerns, resolve issues, make complaints, and/or request assistance with any and all aspects related to the vendor's services and business activities.

Figure 18:
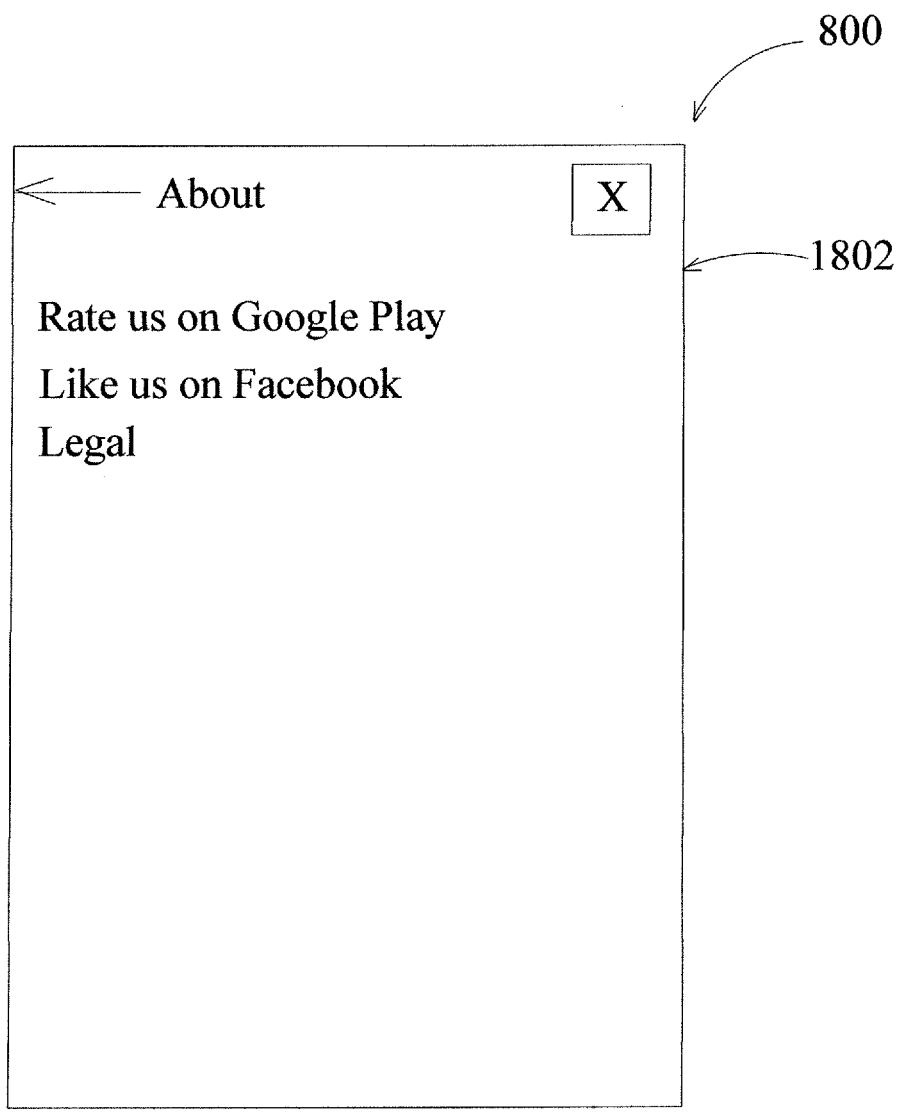
Figure 19:
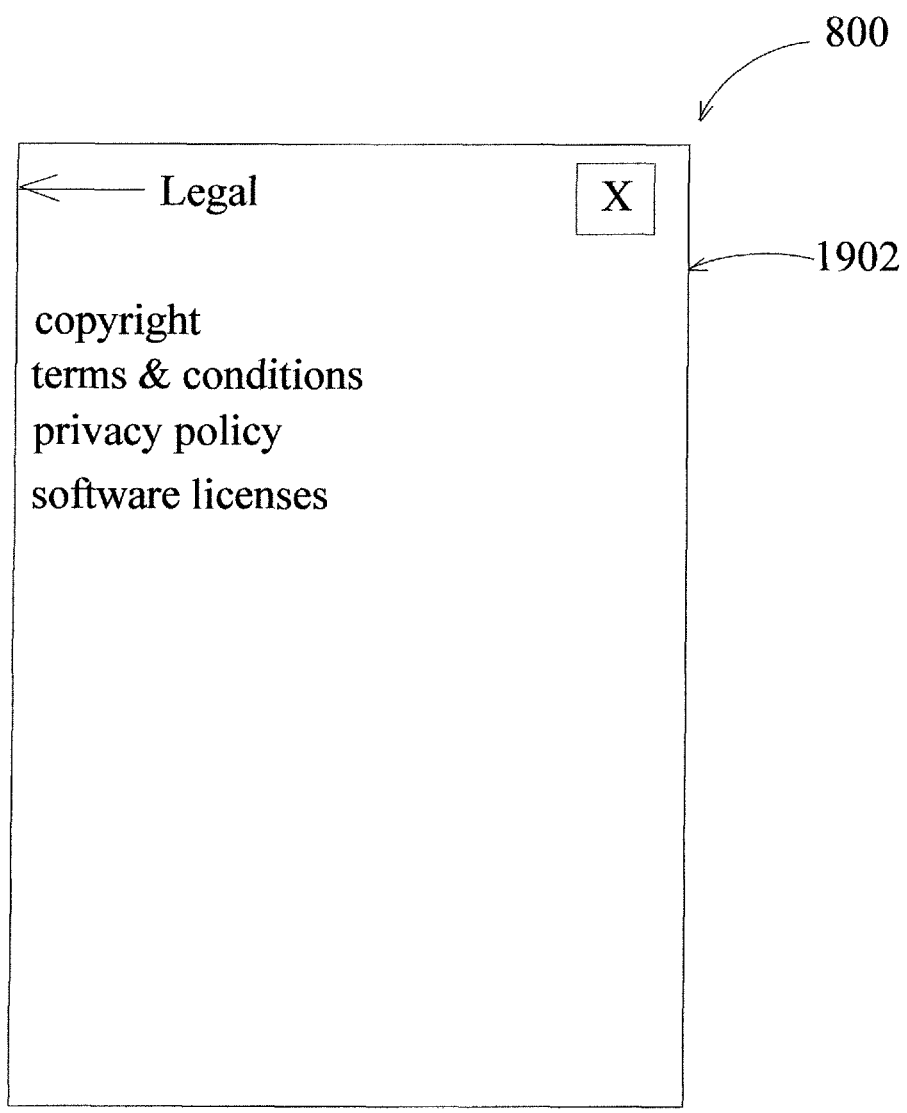

In at least one embodiment, as shown in FIGS. 18-19, the user interface 800 may have at least one policy screen 1802, 1902 which may be accessed by the user by selecting the "about" tab 1116 shown in FIG. 11. In some embodiments, the policy screen 1802 may include an insurance disclosure. In some embodiment, the policy screen 1802 may include information regarding background checks conducted for employees and vendors. The policy screen 1802 may explain, store, or display legal policies and/or rules as shown in FIG. 19. A user may be asked to read the information on one or more of the policy screens 1802, 1902 before the user can receive power source replenishment service. In another embodiment, the user is required to acknowledge by an electronic signature that they have read and accept all of the terms and conditions in the "policy" tab before receiving power source replenishment service.

Figure 20:
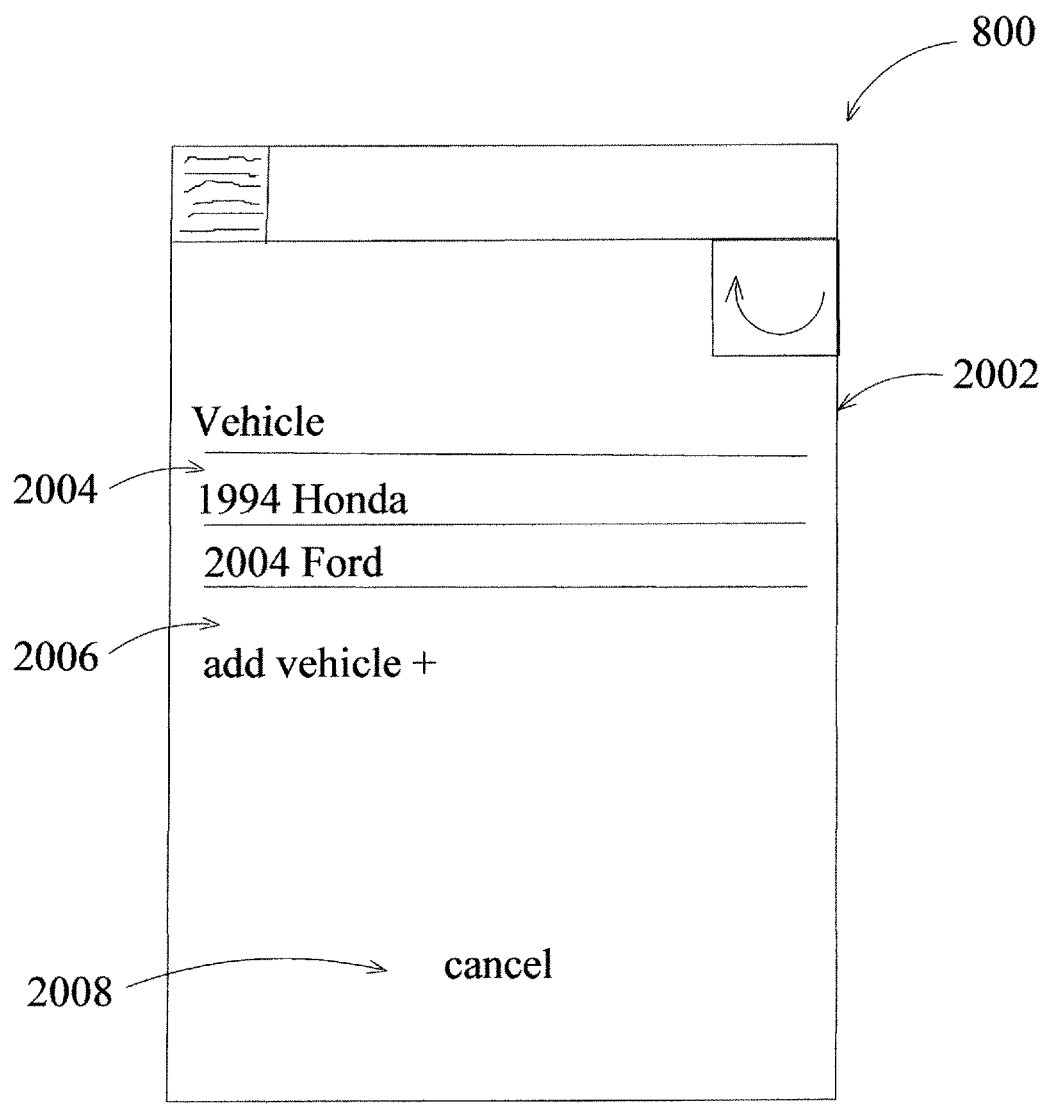
Figure 21:
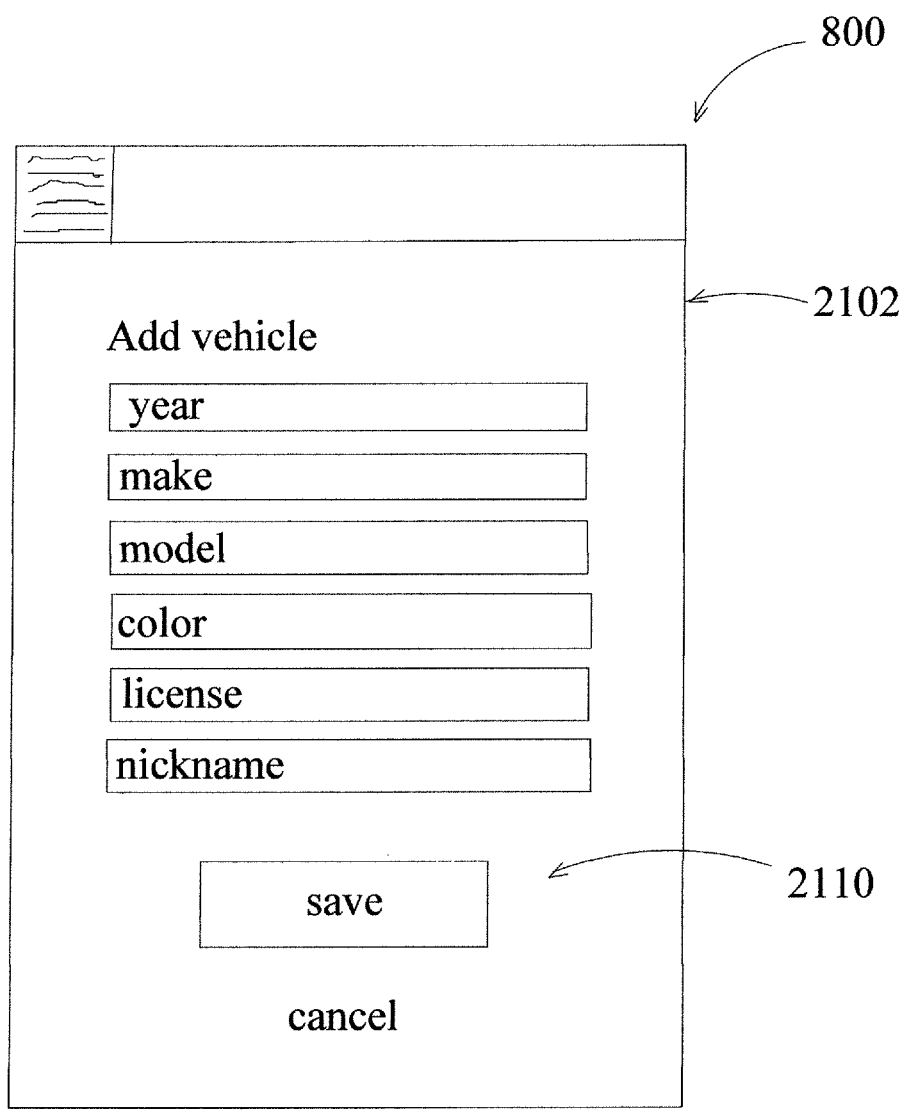

Referring back to FIGS. 10-11, the user may select the order feature 1006 in order to place either an on-demand replenishment request or establish an automatic replenishment request. As shown in FIG. 20, after selecting the order feature 1006, the user may then be directed to a vehicle selection screen 2002 where the user can select from one of the vehicles listed on the screen, as shown generally at 2004, or may add a new vehicle by selecting the vehicle input feature shown at 2006. Optionally, the user may select the cancel feature 2008 and return to the home screen 1000 of the user interface 800. FIG. 21 shows at least one embodiment of a vehicle screen 2102 accessed by the user in at least one embodiment by selecting the vehicle input feature 2006. A user may provide information regarding the vehicle including, but not limited to, the year, make, model, color, mileage, license plate number, and/or a name for the vehicle. In some embodiments, based on the input of the year, make, and model of the vehicle, the platform may automatically retrieve information about the power source replenishment access point on the vehicle and power source information from information stored by the platform regarding vehicles of the same year, make, and model. In some embodiments, based on the input of the year, make, model, and/or mileage of the vehicle, the platform may automatically retrieve maintenance schedule information about the vehicle or information about recommended types of fluids, filters, and other maintenance items. The user may save the new vehicle information by selecting the save feature 2110.

Figure 22:
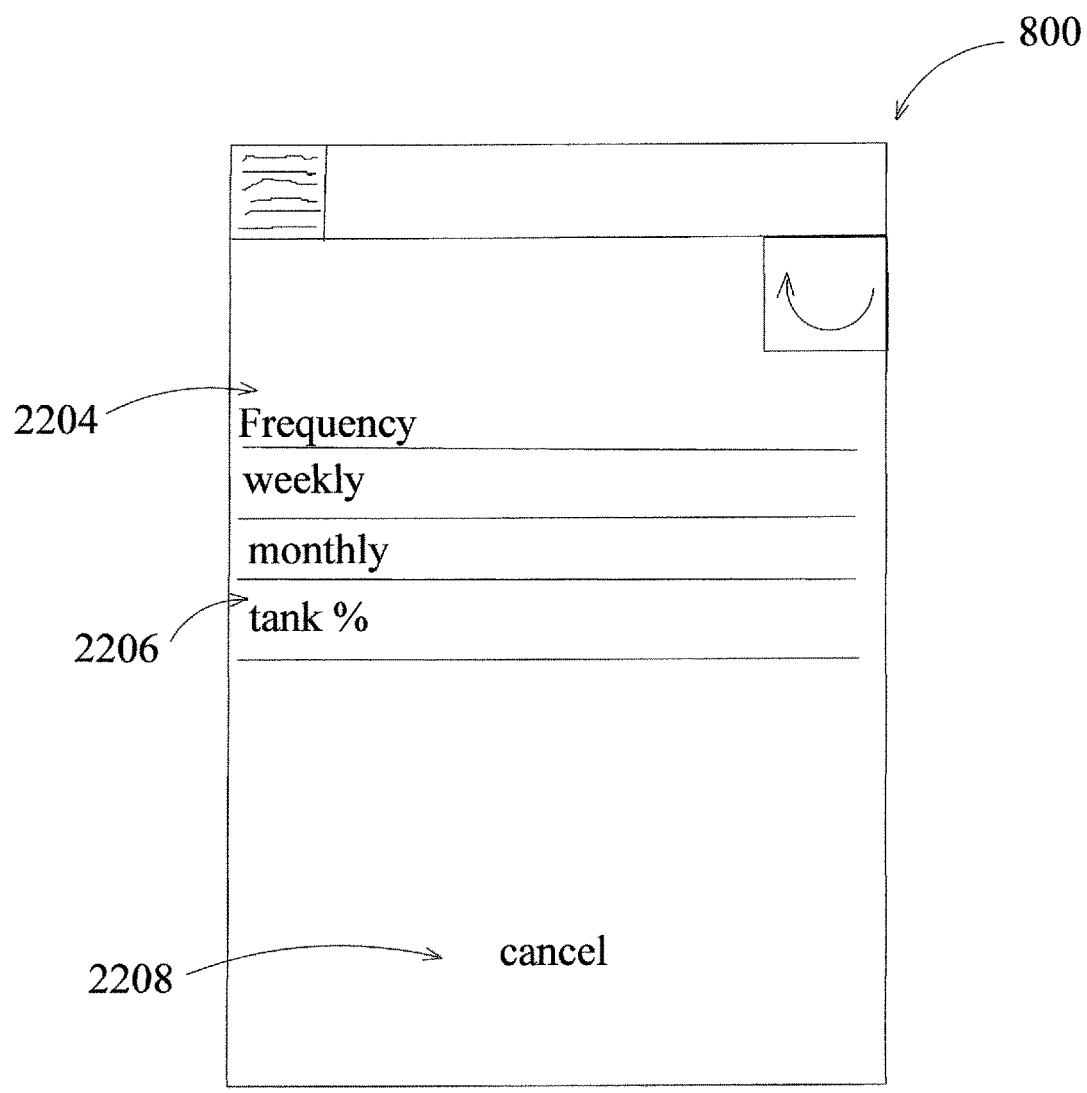
Figure 23:
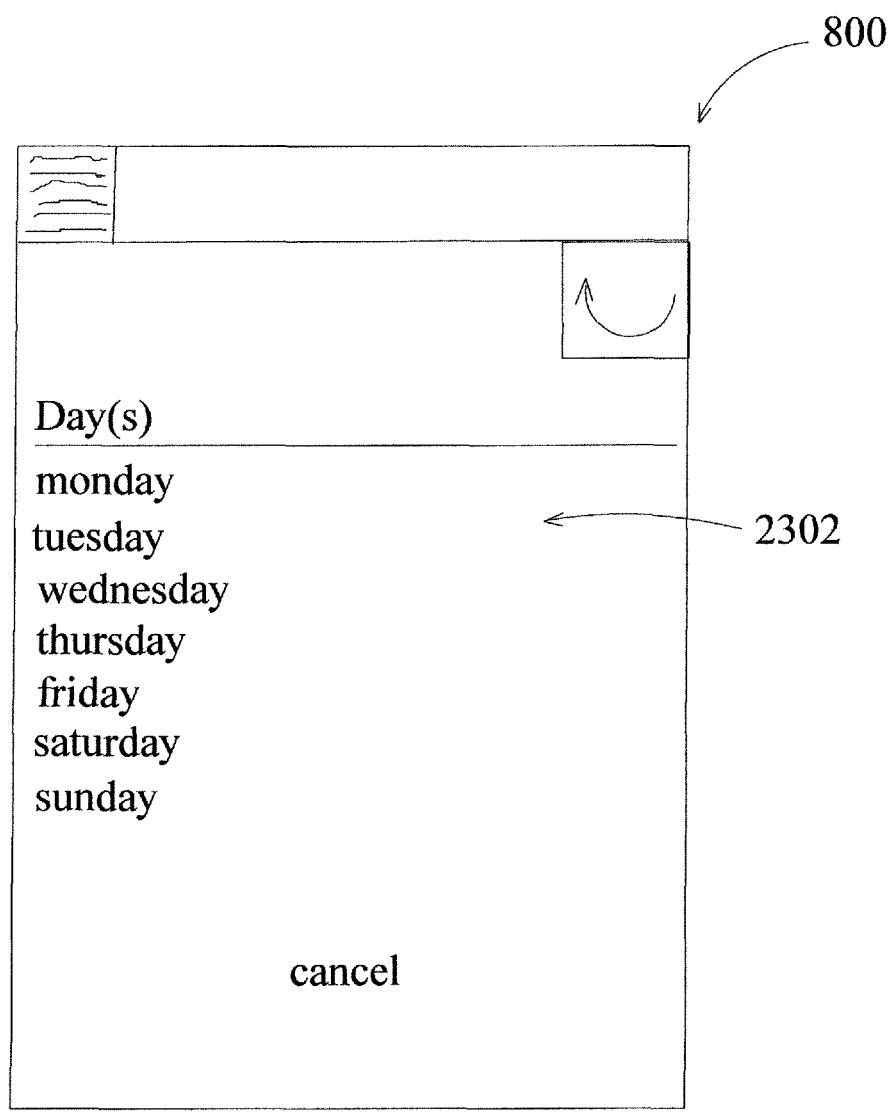
Figure 24:
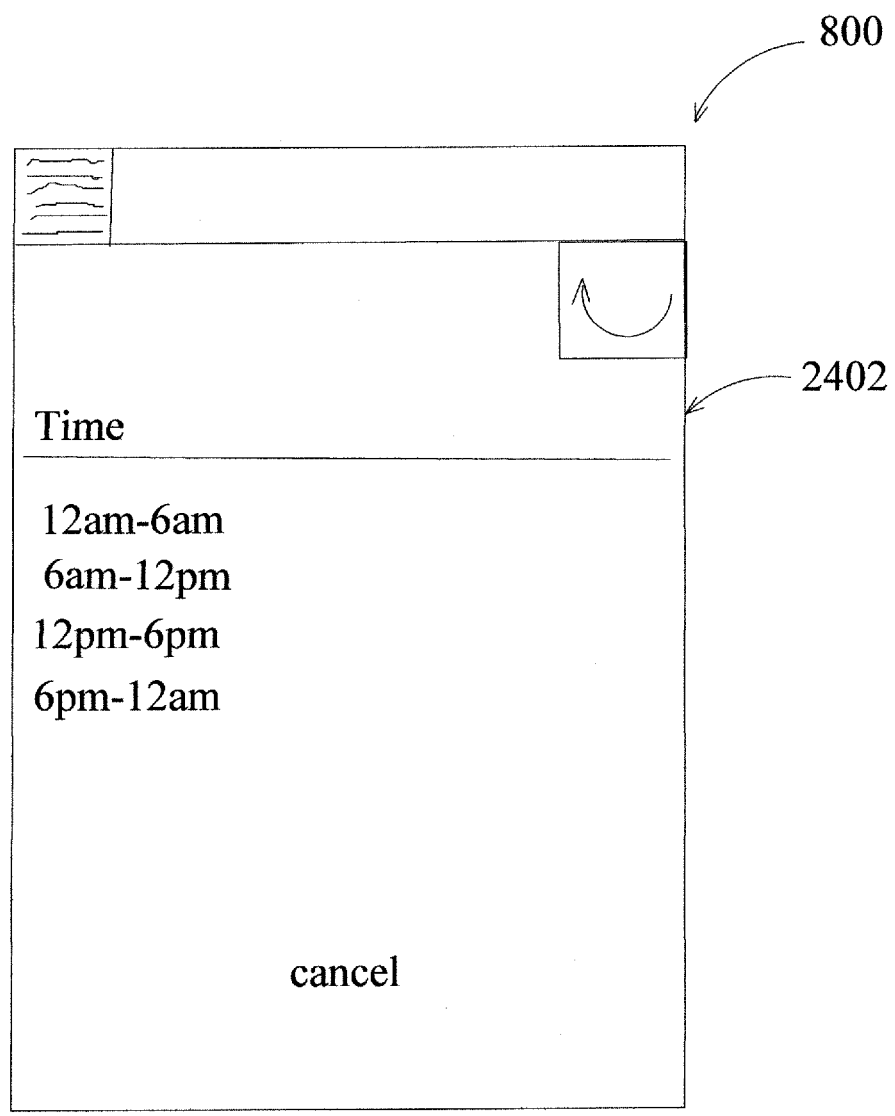
Figure 25:
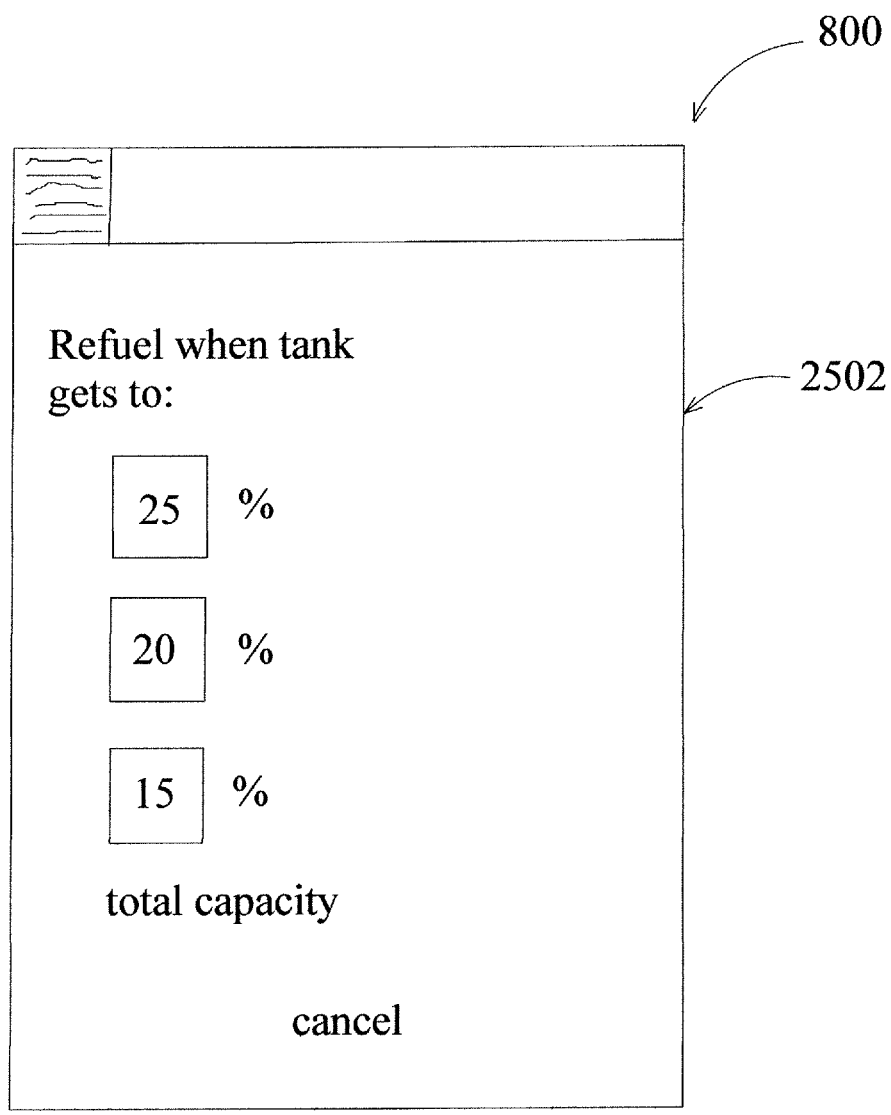

Once the user has selected a vehicle from the vehicle selection screen 2002, in some embodiments, the user then may select the frequency of service from an order option screen shown at 2202 in FIG. 22. Order option screen 2202 allows a user to select from on-demand replenishment, recurring or automatic replenishment as shown generally at 2204, or replenishment based on power source level as shown generally at 2206. Optionally, the user may select the cancel feature 2208 and return to the home screen 1000 of the user interface 800. If the user selects recurring or automatic replenishment, the user then selects the day or days of the week that it wishes to receive service for the selected vehicle, as shown on the date selection screen 2302 of FIG. 23. The user may also select at least one timeframe for service from one or more time period options displayed on a time selection screen 2402 of FIG. 24. If the user selects replenishment based on power source level, the user then selects the percentage of remaining power source for the user vehicle that triggers a replenishment service from a fuel level screen 2502 of FIG. 25.

Figure 26:
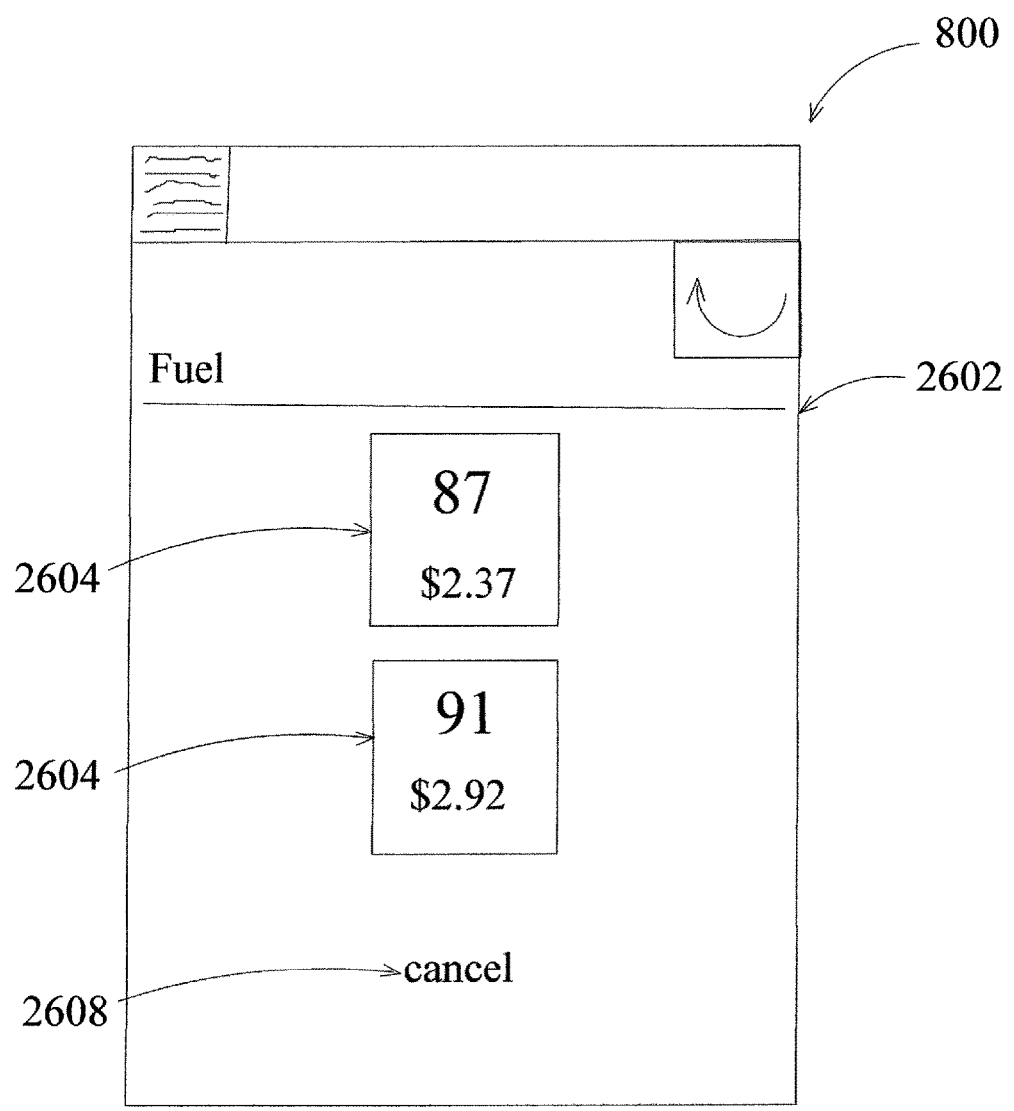

In some embodiments, the user may select a power source from the power source selection screen 2602 of FIG. 26. A number of power source options 2604 may be displayed based on the information provided about the vehicle or prior power source selections by the user. Optionally, the user may select the cancel feature 2608 and return to the home screen 1000 of the user interface 800. In most embodiments, the user may cancel the order and/or editing the information using any cancel feature on any screen within the interface.

Figure 27:
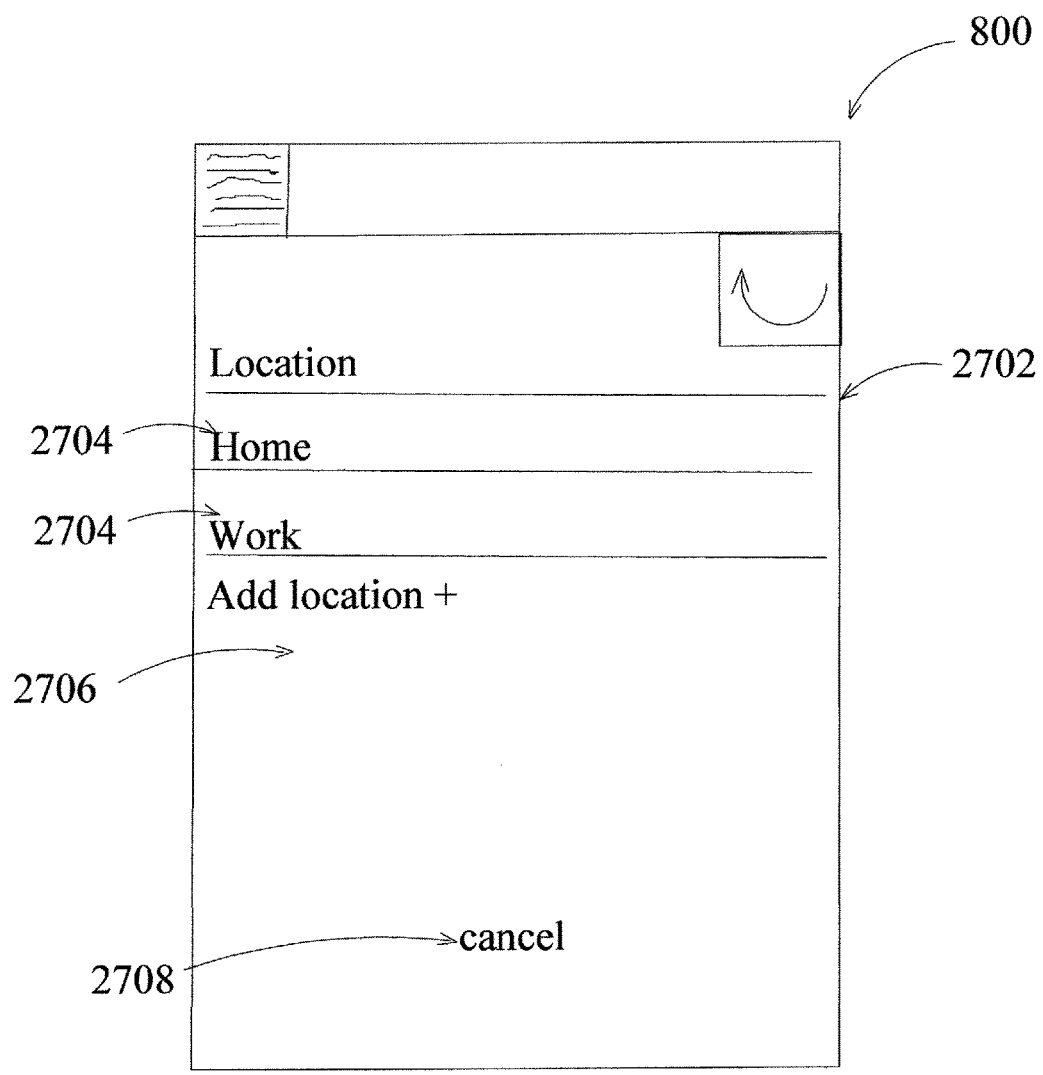

In some embodiments, the user may select a location for the replenishment service from the location selection screen 2702 of FIG. 27. The user may select from a number of stored locations, as shown generally at 2704, or may add a new location by selecting the location input feature 2706. In some embodiments, selecting the location input feature 2706 may then display the location screen 1302 of FIG. 13. In at least one embodiment, the location may be automatically selected based on GPS information for the user device or for the user vehicle. Optionally, the user may select the cancel feature 2708 and return to the home screen 1000 of the user interface 800.

Figure 28:
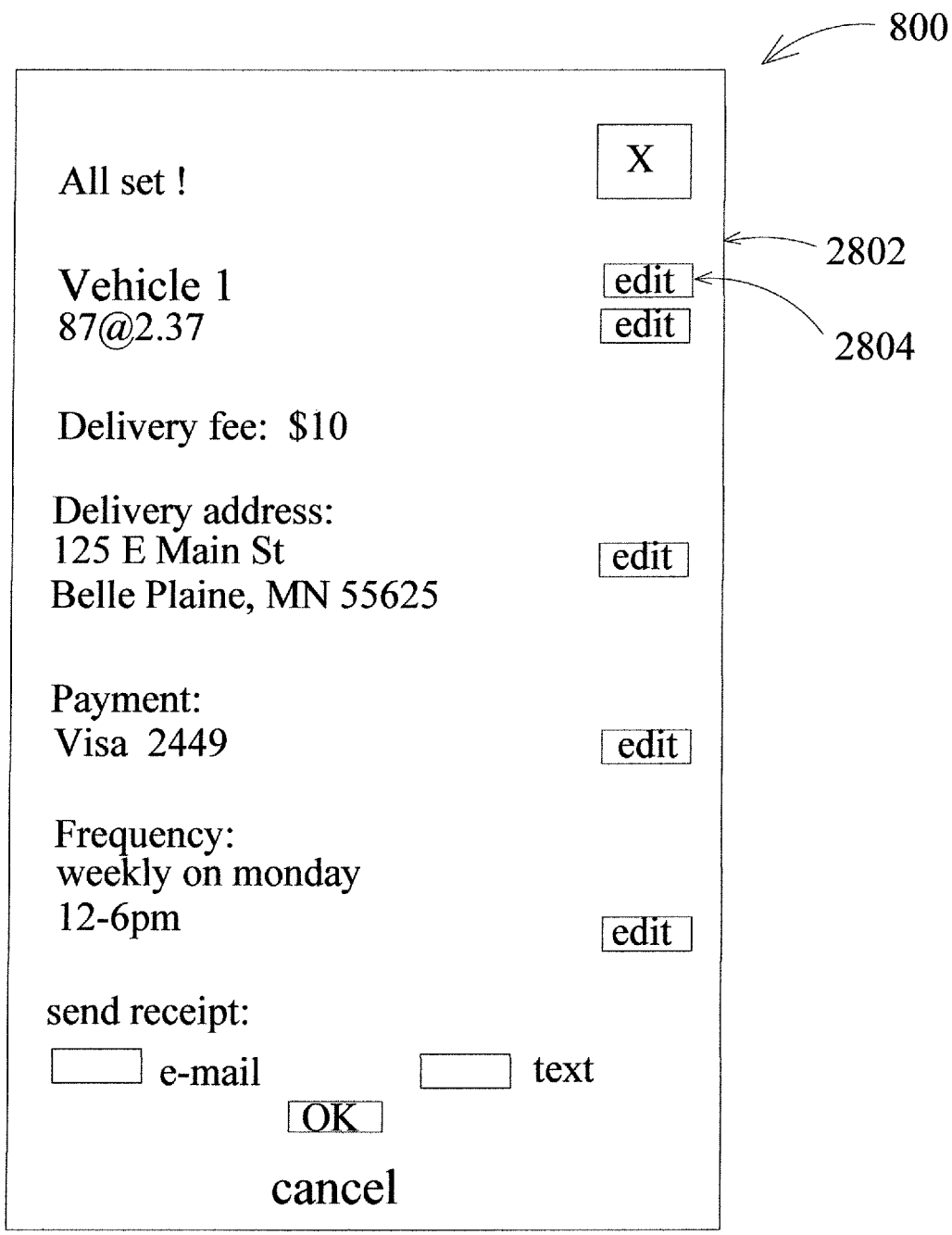
Figure 29:
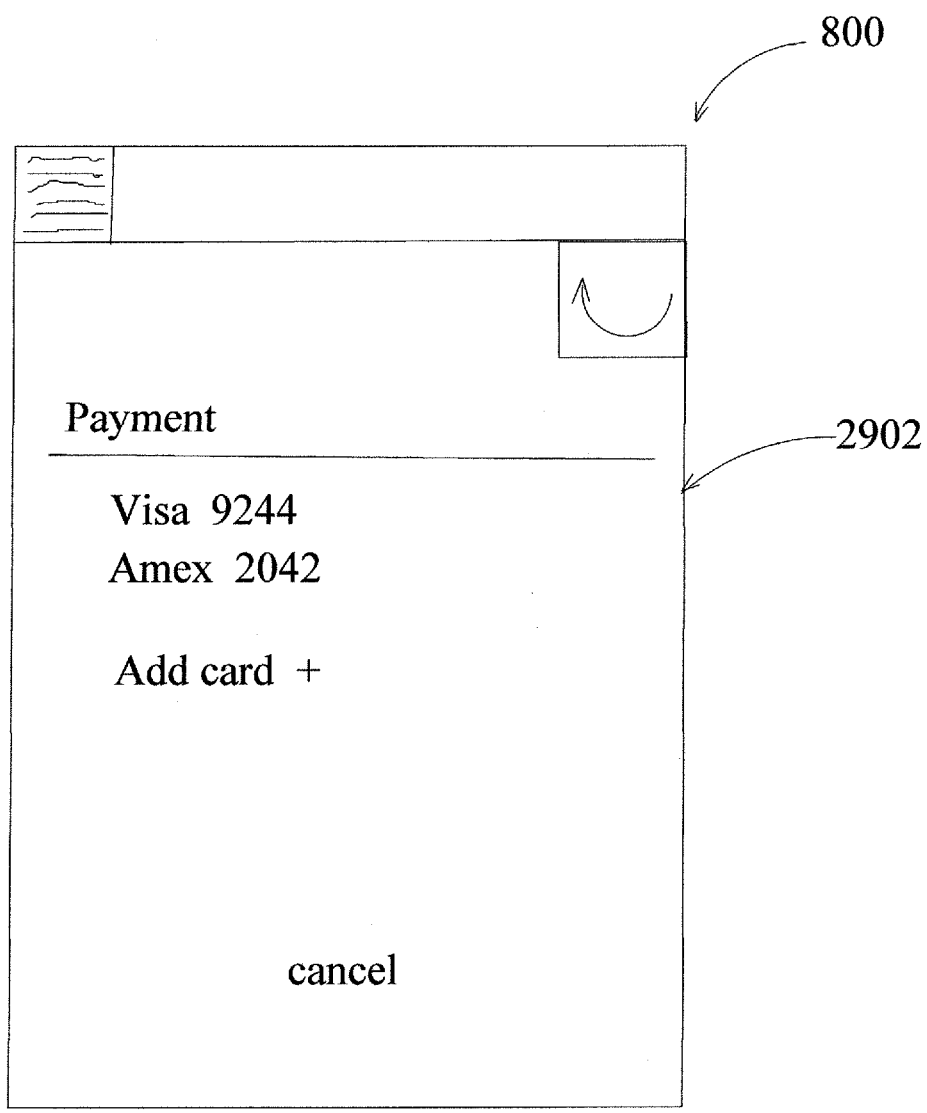

FIG. 28 shows one embodiment of an order confirmation screen 2802 for the user interface 800. Information displayed by the order confirmation screen 2802 may include information regarding the vehicle selected for replenishment services, information regarding the power source type selected, delivery fees, the location for the replenishment service, payment information. Where the user request was for scheduled or automatic services, the order confirmation screen may display date and time information for the service. In some embodiments, the user may edit the displayed information by selecting the edit feature 2804, which returns the user to the appropriate screen for editing the information. For example, if the user wants to edit the vehicle information displayed on the order confirmation screen 2802, selecting the edit feature 2804 returns the user to the vehicle screen 2102. FIG. 29 shows a payment confirmation screen 2902 for the user interface 800 to authorize payment.

Figure 30:
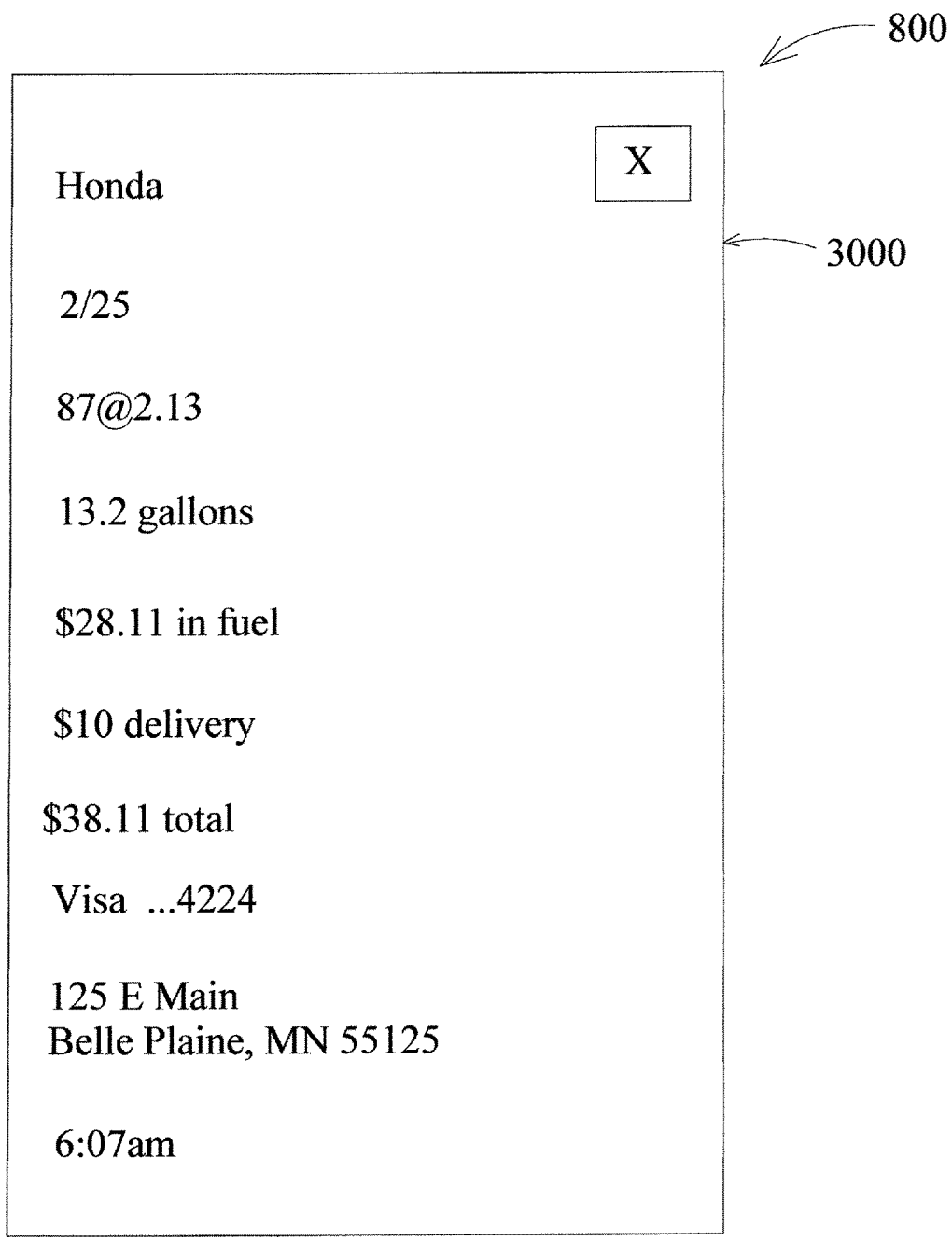

FIG. 30 shows one embodiment of a receipt 3000 displayed to the user after completion of the service. The receipt may display one or more of the following information: vehicle serviced, date serviced, time serviced, type of power source used, power source price, amount of power source replenished, cost of power source replenished, delivery fee, cost for other services or products provided, total cost, payment information, location of service, vendor name, and/or vendor driver name.

Figure 31:
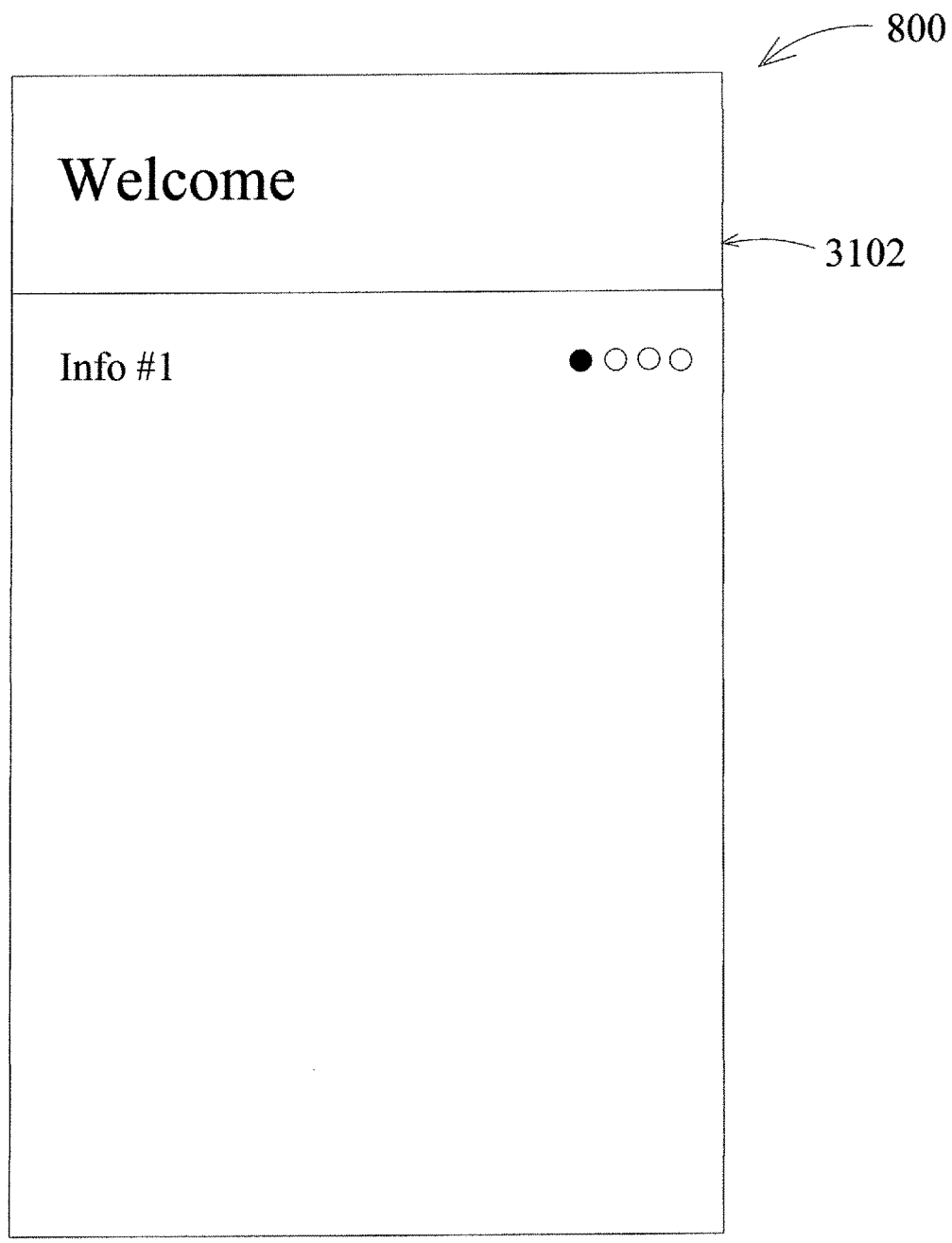

FIG. 31 shows one embodiment of a splash screen 3102 for the user interface 800, which may provide the user with information regarding upcoming services, maintenance notifications, specials, rewards, and/or other information pertinent to the user or advertising material.

Figure 32:
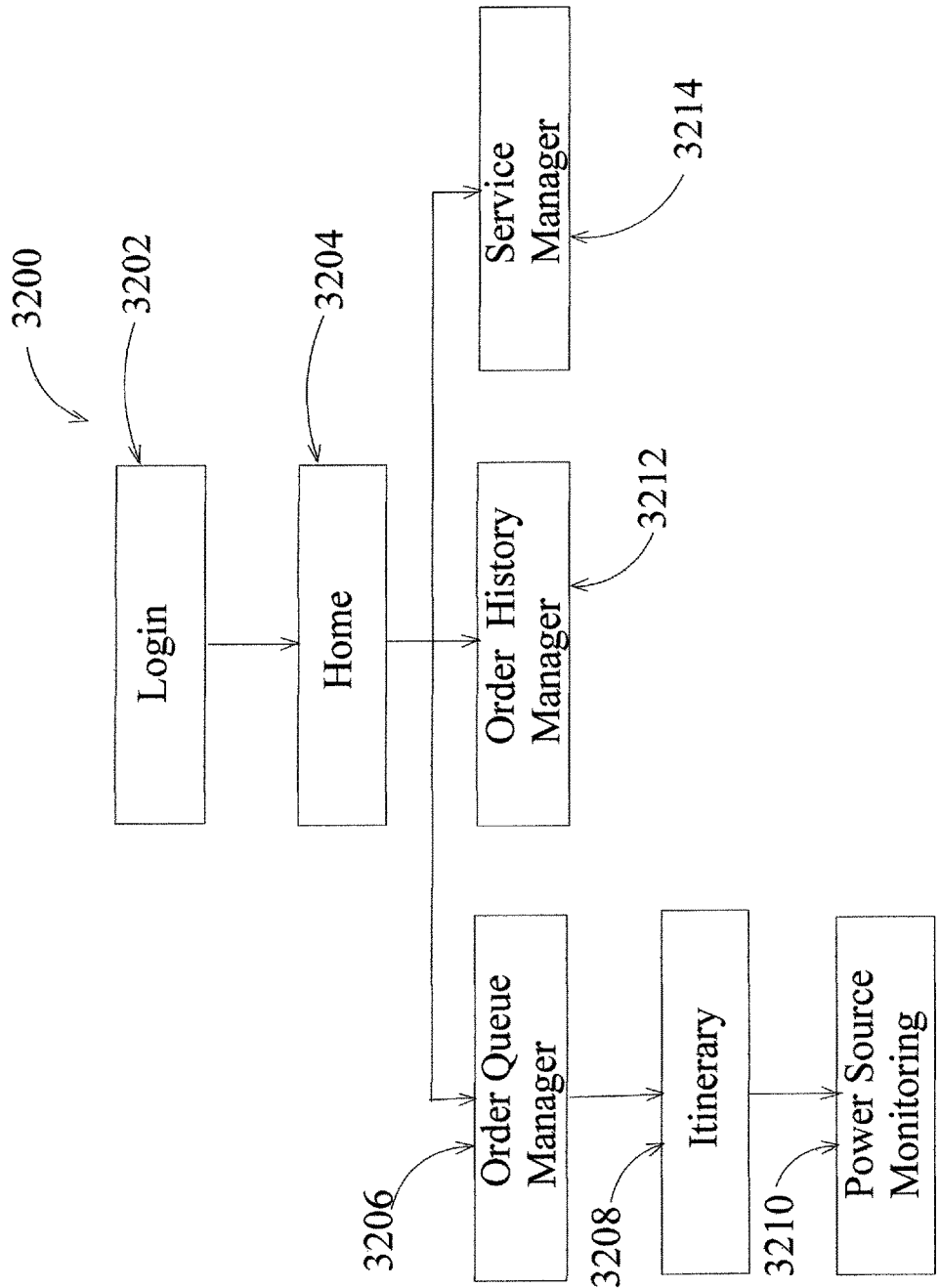
FIG. 32 is a flowchart of one embodiment of a vendor interface.
Figure 33:
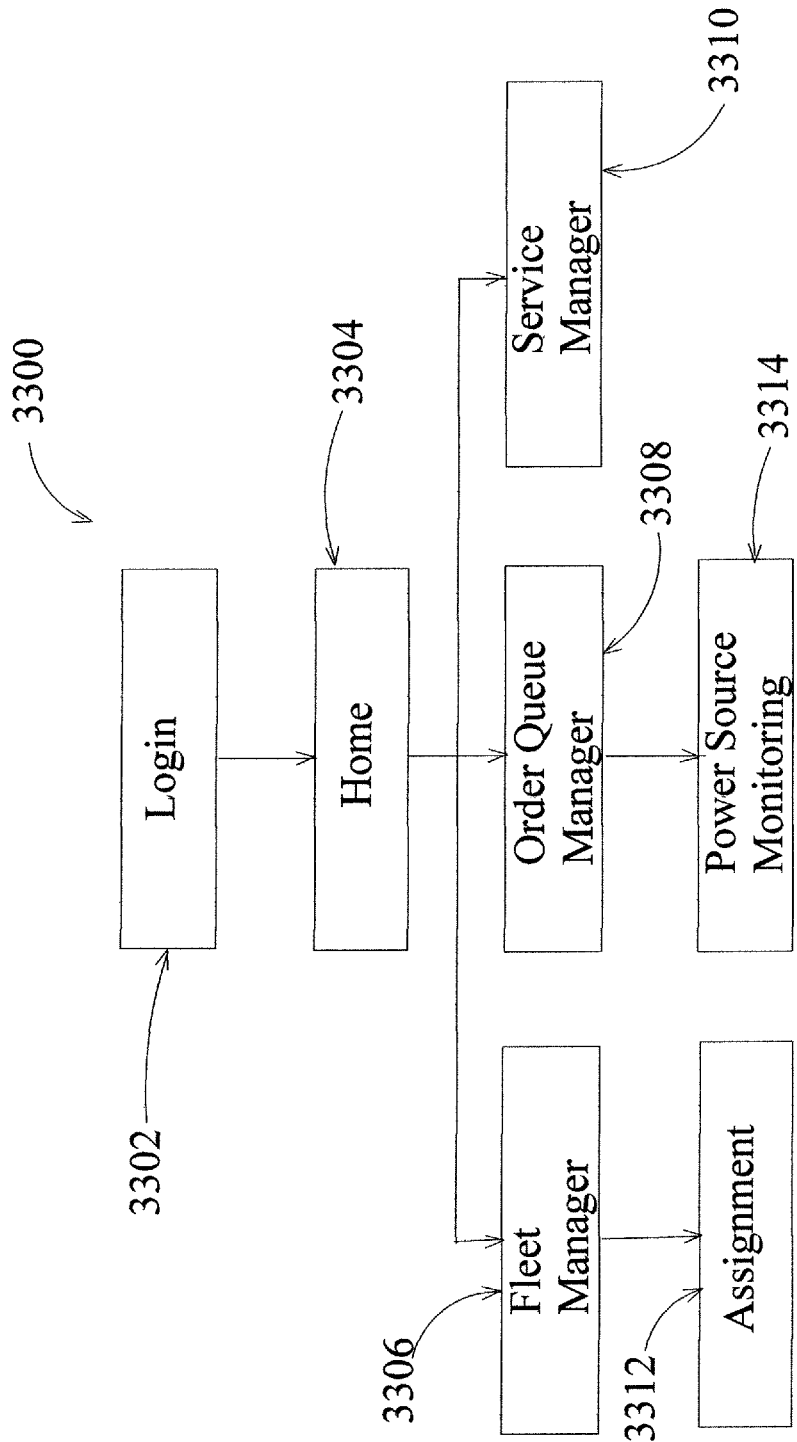
FIG. 33 is a flowchart of one embodiment of a vendor manager interface.

FIGS. 32-33 show embodiments of vendor interfaces 3200, 3300 of the platform. FIG. 32 shows one embodiment of a vendor interface 3200 for the platform for use by a vendor, a vendor employee, a vendor agent, or a driver of the power source transport vehicle. Vendor interface 3200 may comprise a login screen 3202, and once the vendor logs in with vendor credentials, a home screen 3204 may be displayed. From the home screen 3204, the vendor may select from a number of options, which may include, but are not limited to, an order queue manager as shown at 3206, order history manager at 3212, and/or service manager as shown at 3214. The order queue manager receives user requests from the platform and displays the user requests to the vendor to complete. In at least one embodiment, the vendor selects a completion feature upon completion of the replenishment service and the platform then authorizes the display of the receipt via the user interface. The order queue manager may comprise an itinerary feature shown at 3208 that provides the vendor with an itinerary for replenishing power source. In at least one embodiment, the itinerary may be optimized for efficiency based on a capacity of power source for the power source transport vehicle, the location of the power source transport vehicle, and user requests. In some embodiments, the itinerary feature may display the itinerary as a map or a list or may have some other arrangement. The itinerary feature may continuously or periodically update based at least on location information regarding the power source transport vehicle and user requests. The order queue manager may comprise a power source monitoring feature 3210 that displays to the vendor how much power source remains on the power source transport vehicle so that the vendor knows when it needs to refill or replace the power source container(s). The vendor may also be able to retrieve receipts or information from completed replenishment requests and/or automatic requests from the order history manager 3212. The service manager 3214 may allow the vendor to update maintenance services, other products and services offered, rewards offered, and other settings.

FIG. 33 shows one embodiment of a vendor management interface 3300 that may be used by a supervisor or manager of a vendor who may be monitoring one or more power source transport vehicles. Vendor interface 3300 may comprise a login screen 3302, and once the vendor logs in with vendor manager credentials, a home screen 3304 may be displayed. From the home screen 3304, the vendor may select from a number of options, which may include, but are not limited to, a fleet manager as shown at 3306, order queue manager at 3308, and/or service manager as shown at 3310. The fleet manager 3306 receives location information for the power source transport vehicles and user requests from the platform. The vendor manager may assign power source transport vehicles to user requests based on the information displayed at assignment feature 3312. The fleet manager 3306 may include a tracking feature to allow the vendor manager to monitor the power source transport vehicles' location. The order queue manager may have an itinerary feature and may further comprise a power source monitoring feature 3314 that displays to the vendor how much power source remains on one or more power source transport vehicle so that the vendor knows when it needs to refill or replace the power source container(s) or deploy a different power source transport vehicle. The service manager 3316 may allow the vendor to review receipt information, update maintenance services, other products and services offered, rewards offered, and other settings.

Any system on which a platform of the present disclosure, or a portion thereof, may be located, run on, or accessed through may be a minicomputer, mainframe computer, personal computer (e.g., desktop or laptop), tablet computer, mobile device (e.g., personal digital assistant (PDA) or smart phone) or other hand-held computing device, server (e.g., blade server or rack server), a network storage device, or any other suitable device or combination of devices and may vary in size, shape, performance, functionality, and price. Any such system may include volatile memory (e.g., random access memory (RAM)), one or more processing resources such as a central processing unit (CPU) or hardware or software control logic, ROM, and/or other types of nonvolatile memory (e.g., EPROM, EEPROM, etc.). A basic input/output system (BIOS) can be stored in the non-volatile memory (e.g., ROM), and may include basic routines facilitating communication of data and signals between components within the system. The volatile memory may additionally include a high-speed RAM, such as static RAM for caching data.

Additional components of a system may include one or more disk drives or one or more mass storage devices, one or more network ports for communicating with external devices as well as various input and output (I/O) devices, such as a keyboard, a mouse, touchscreen and/or a video display. Mass storage devices may include, but are not limited to, a hard disk drive, floppy disk drive, CD-ROM drive, smart drive, flash drive, or other types of non-volatile data storage, a plurality of storage devices, a storage subsystem, or any combination of storage devices. A storage interface may be provided for interfacing with mass storage devices, for example, a storage subsystem. The storage interface may include any suitable interface technology, such as EIDE, ATA, SATA, and IEEE 1394. A system may include what is referred to as a user interface for interacting with the system, which may generally include a display, mouse or other cursor control device, keyboard, button, touchpad, touch screen, stylus, remote control (such as an infrared remote control), microphone, camera, video recorder, gesture systems (e.g., eye movement, head movement, etc.), speaker, LED, light, joystick, game pad, switch, buzzer, bell, and/or other user input/output device for communicating with one or more users or for entering information into the system. These and other devices for interacting with the system may be connected to the system through I/O device interface(s) via a system bus, but can be connected by other interfaces such as a parallel port, IEEE 1394 serial port, a game port, a USB port, an IR interface, etc. Output devices may include any type of device for presenting information to a user, including but not limited to, a computer monitor, flat-screen display, or other visual display, a printer, and/or speakers or any other device for providing information in audio form, such as a telephone, a plurality of output devices, or any combination of output devices.

A system may also include one or more buses operable to transmit communications between the various hardware components. A system bus may be any of several types of bus structure that can further interconnect, for example, to a memory bus (with or without a memory controller) and/or a peripheral bus (e.g., PCI, PCIe, AGP, LPC, etc.) using any of a variety of commercially available bus architectures.

One or more programs or applications, such as an application or app described herein, or a portion thereof, and/or other executable applications, may be stored in one or more of the system data storage devices. Generally, programs may include routines, methods, data structures, other software components, etc., that perform particular tasks or implement particular abstract data types. Programs or applications may be loaded in part or in whole into a main memory or processor during execution by the processor. One or more processors may execute applications or programs to run systems or methods of the present disclosure, or portions thereof, stored as executable programs or program code in the memory, or received from the Internet or other network. Any commercial or freeware web browser or other application capable of retrieving content from a network and displaying pages or screens may be used. In some embodiments, a customized application may be used to access, display, and update information. A user may interact with the system, programs, and data stored thereon or accessible thereto using any one or more of the input and output devices described above.

A system of the present disclosure can operate in a networked environment using logical connections via a wired and/or wireless communications subsystem to one or more networks and/or other computers. Other computers can include, but are not limited to, workstations, servers, routers, personal computers, microprocessor-based entertainment appliances, peer devices, or other common network nodes, and may generally include many or all of the elements described above. Logical connections may include wired and/or wireless connectivity to a local area network (LAN), a wide area network (WAN), hotspot, a global communications network, such as the Internet, and so on. The system may be operable to communicate with wired and/or wireless devices or other processing entities using, for example, radio technologies, such as the IEEE 802.xx family of standards, and includes at least Wi-Fi (wireless fidelity), WiMax, and Bluetooth wireless technologies. Communications can be made via a predefined structure as with a conventional network or via an ad hoc communication between at least two devices.

Hardware and software components of the present disclosure, as discussed herein, may be integral portions of a single computer or server or may be connected parts of a computer network. The hardware and software components may be located within a single location or, in other embodiments, portions of the hardware and software components may be divided among a plurality of locations and connected directly or through a global computer information network, such as the Internet. Accordingly, aspects of the various embodiments of the present disclosure can be practiced in distributed computing environments where certain tasks are performed by remote processing devices that are linked through a communications network. In such a distributed computing environment, program modules may be located in local and/or remote storage and/or memory systems.

As will be appreciated by one of skill in the art, the various embodiments of the present disclosure may be embodied as a method (including, for example, a computer-implemented process, a business process, and/or any other process), apparatus (including, for example, a system, machine, device, computer program product, and/or the like), or a combination of the foregoing. Accordingly, embodiments of the present disclosure may take the form of an entirely hardware embodiment, an entirely software embodiment (including firmware, middleware, microcode, hardware description languages, etc.), or an embodiment combining software and hardware aspects. Furthermore, embodiments of the present disclosure may take the form of a computer program product on a computer-readable medium or computer-readable storage medium, having computer-executable program code embodied in the medium, that define processes or methods described herein. A processor or processors may perform the necessary tasks defined by the computer-executable program code. Computer-executable program code for carrying out operations of embodiments of the present disclosure may be written in an object oriented, scripted or unscripted programming language such as Java, Perl, PHP, Visual Basic, Smalltalk, C++, or the like. However, the computer program code for carrying out operations of embodiments of the present disclosure may also be written in conventional procedural programming languages, such as the C programming language or similar programming languages. A code segment may represent a procedure, a function, a subprogram, a program, a routine, a subroutine, a module, an object, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In the context of this document, a computer readable medium may be any medium that can contain, store, communicate, or transport the program for use by or in connection with the systems disclosed herein. The computer-executable program code may be transmitted using any appropriate medium, including but not limited to the Internet, optical fiber cable, radio frequency (RF) signals or other wireless signals, or other mediums. The computer readable medium may be, for example but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device. Computer-readable media includes, but is not to be confused with, computer-readable storage medium, which is intended to cover all physical, non-transitory, or similar embodiments of computer-readable media.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is generally no significant effect thereof.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

I claim:

1. A method for replenishing a power source of a user vehicle, comprising:
   receiving a user request for power source replenishment services for a user vehicle at a first location through a platform having a user interface accessible with a user device;
   coordinating the request with power source replenishment vendors through the platform with an on-board navigation system;
   directing the user vehicle through the platform to autonomously relocate itself to a second location having a power source replenishment station associated with a vendor using the on-board navigation system; and
   upon arrival of the vehicle at the second location, replenishing an amount of power source on the user vehicle from an amount of power source stored by the vendor at the power source replenishment station.

2. The method of claim 1, wherein replenishing an amount of power source of the user vehicle is done by either the user of the user vehicle
   or by a person acting on behalf of the vendor.

3. The method of claim 1, wherein the power source comprises at least one of gasoline, diesel, biodiesel, ethanol, isobutanol, methanol, butane, kerosene, propane, natural gas, synthetic fuels, complex hydrides, hydrogen, hydrogen peroxide, and oxygen.

4. The method of claim 1, wherein the power source comprises at least one power source from the group consisting of at least one fuel cell, at least one battery, and electrical power.

5. The method of claim 1, wherein the power source replenishment station is comprised of one or more power source replenishment units.

6. The method of claim 1, wherein the power source replenishment station may be fixed or mobile.

7. The method of claim 1, wherein the user vehicle is navigated autonomously from the power source replenishment station after replenishment of the power source to the first location or to another location.

8. The method of claim 1, wherein the platform has a vendor interface accessible via a vendor device with at least one vendor and displays information about the user request on the vendor interface.

9. The method of claim 1, wherein the method for the user to input information into the platform comprises at least one method selected from the group consisting of:
- speaking on a telephone or using a telephone, computer, tablet, vehicle console module, or other device to email, text, or otherwise communicate using some form of electronic messaging method without using what has been commonly referred to as an "app";
- using an "app" or other software application that is stored or executed on a telephone, computer, tablet, vehicle console module, or other device;
- using an electronic device to access an app via a network; and
- using a vehicle console module, computer, location detection, remote unlocking, and reporting device located on the vehicle.

10. The method of claim 1, wherein information input into the platform comprises at least one specific piece of information selected from the group consisting of: specific information about the user vehicle, information about the vehicle replenishment point, power source information, specific time for the replenishment including immediately, whether the replenishment should be on a periodic basis, and whether the replenishment should occur when the power source reserves reach a specific percentage of total power source capacity.

11. The method of claim 1, wherein replenishing an amount of power source of the user vehicle is done either automatically or semi-automatically.

12. A system for replenishment of the power source of a user vehicle comprising:
- a mobile power source replenishment station;
- means for vendor delivery of the power source replenishment to a given location;
- means for navigating the user vehicle to the power source replenishment station in response to a user request for power source replenishment; and
- means for power source replenishment of the user vehicle by the power source replenishment station;
- wherein the navigation to the power source replenishment station and the power source replenishment of the user vehicle are coordinated by a digital platform connecting users to vendors.

13. A method for replenishing a power source of a user vehicle, comprising:
- providing a platform having a user interface accessible via a user device and a vendor interface accessible via a vendor device, the platform configured for coordinating a user request for power replenishment with at least one vendor; and
- upon receiving a user request for power replenishment, navigating the user vehicle autonomously using an on-board navigation system to a power source replenishment station associated with a vendor.

14. The method of claim 13, wherein the platform displays at least information about the user request through the user interface accessible via the user device.

15. The method of claim 13, wherein the platform displays at least information about the user request through the vendor interface accessible via the vendor device.

16. The method of claim 13, further comprising, upon arrival of the user vehicle at the power source replenishment station, replenishing an amount of power source on the user vehicle from an amount of power source stored by the vendor at the power source replenishment station.

17. The method of claim 16, wherein replenishing an amount of power source of the user vehicle is done by either the user of the user vehicle or a person acting on behalf of the vendor.

18. The method of claim 16, wherein replenishing an amount of power source of the user vehicle is done either automatically or semi-automatically.

19. The method of claim 13, wherein the method for the user to input information into the platform comprises at least one method selected from the group consisting of:
- speaking on a telephone or using a telephone, computer, tablet, vehicle console module, or other device to email, text, or otherwise communicate using some form of electronic messaging method without using what has been commonly referred to as an "app";
- using an "app" or other software application that is stored or executed on a telephone, computer, tablet, vehicle console module, or other device;
- using an electronic device to access an app via a network; and
- using a vehicle console module, computer, location detection, remote unlocking, and reporting device located on the vehicle.

20. The method of claim 13, wherein the user request comprises at least one specific piece of information from the group consisting of: information about the user vehicle, information about the fuel replenishment station, power source information, specific time for the replenishment including immediately, and whether the replenishment should occur when the power source reserves reach a specific percentage of total power source capacity.

* * * * *